United States Patent
McPhee et al.

(10) Patent No.: US 11,704,878 B2
(45) Date of Patent: *Jul. 18, 2023

(54) SURFACE AWARE LENS

(71) Applicant: Snap Inc., Santa Monica, CA (US)

(72) Inventors: Andrew James McPhee, Culver City, CA (US); Ebony James Charlton, Los Angeles, CA (US); Samuel Edward Hare, Los Angeles, CA (US); Michael John Evans, Venice, CA (US); Jokubas Dargis, Santa Monica, CA (US); Ricardo Sanchez-Saez, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/505,370

(22) Filed: Oct. 19, 2021

(65) Prior Publication Data
US 2022/0036660 A1    Feb. 3, 2022

Related U.S. Application Data

(63) Continuation of application No. 16/922,618, filed on Jul. 7, 2020, now Pat. No. 11,195,338, which is a
(Continued)

(51) Int. Cl.
*G06T 19/00*     (2011.01)
*G06T 15/20*     (2011.01)
(Continued)

(52) U.S. Cl.
CPC ............ *G06T 19/006* (2013.01); *G06F 3/011* (2013.01); *G06F 3/0346* (2013.01); *G06T 15/205* (2013.01); *G06T 15/60* (2013.01)

(58) Field of Classification Search
None
See application file for complete search history.

(56) References Cited

U.S. PATENT DOCUMENTS

| 5,751,850 A | 5/1998 | Rindtorff |
| 5,880,731 A | 3/1999 | Liles et al. |

(Continued)

FOREIGN PATENT DOCUMENTS

| CA | 2887596 A1 | 7/2015 |
| CN | 103460256 | 12/2013 |

(Continued)

OTHER PUBLICATIONS

US 10,964,114 B2, 03/2021, Hare et al. (withdrawn)
(Continued)

*Primary Examiner* — Kyle Zhai
(74) *Attorney, Agent, or Firm* — Schwegman Lundberg & Woessner, P.A.

(57) ABSTRACT

Aspects of the present disclosure involve a system comprising a computer-readable storage medium storing at least one program, and a method for rendering three-dimensional virtual objects within real-world environments. Virtual rendering of a three-dimensional virtual object can be altered appropriately as a user moves around the object in the real-world through utilization of a redundant tracking system comprising multiple tracking sub-systems. Virtual object rendering can be with respect to a reference surface in a real-world three-dimensional space depicted in a camera view of a mobile computing device.

20 Claims, 19 Drawing Sheets

Related U.S. Application Data continuation of application No. 16/283,482, filed on Feb. 22, 2019, now Pat. No. 10,740,978, which is a continuation of application No. 15/863,575, filed on Jan. 5, 2018, now Pat. No. 10,242,503.

(60) Provisional application No. 62/444,218, filed on Jan. 9, 2017.

(51) Int. Cl.
   *G06T 15/60* (2006.01)
   *G06F 3/0346* (2013.01)
   *G06F 3/01* (2006.01)

(56) References Cited

U.S. PATENT DOCUMENTS

| | | |
|---|---|---|
| 6,020,891 A | 2/2000 | Rekimoto |
| 6,023,270 A | 2/2000 | Brush, II et al. |
| 6,038,295 A | 3/2000 | Mattes |
| 6,157,342 A | 12/2000 | Okude et al. |
| 6,223,165 B1 | 4/2001 | Lauffer |
| 6,434,277 B1 | 8/2002 | Yamada et al. |
| 6,772,195 B1 | 8/2004 | Hatlelid et al. |
| 6,842,779 B1 | 1/2005 | Nishizawa |
| 6,867,787 B1 | 3/2005 | Shimizu et al. |
| 6,980,909 B2 | 12/2005 | Root et al. |
| 7,173,651 B1 | 2/2007 | Knowles |
| 7,342,587 B2 | 3/2008 | Danzig et al. |
| 7,411,493 B2 | 8/2008 | Smith |
| 7,468,729 B1 | 12/2008 | Levinson |
| 7,535,890 B2 | 5/2009 | Rojas |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,199,747 B2 | 6/2012 | Rojas et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,553,032 B1 | 10/2013 | Poston |
| 8,559,980 B2 | 10/2013 | Pujol |
| 8,564,621 B2 | 10/2013 | Branson et al. |
| 8,564,710 B2 | 10/2013 | Nonaka et al. |
| 8,570,343 B2 | 10/2013 | Halstead |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,730,156 B2 | 5/2014 | Weising et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,031,809 B1 | 5/2015 | Kumar et al. |
| 9,040,574 B2 | 5/2015 | Wang et al. |
| 9,055,416 B2 | 6/2015 | Rosen et al. |
| 9,058,757 B2 | 6/2015 | Bala et al. |
| 9,086,776 B2 | 7/2015 | Ye et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,191,776 B2 | 11/2015 | Root et al. |
| 9,204,252 B2 | 12/2015 | Root |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,430,791 B1 | 8/2016 | Sutton-shearer |
| 9,442,564 B1 | 9/2016 | Dillon |
| 9,443,227 B2 | 9/2016 | Evans et al. |
| 9,460,541 B2 | 10/2016 | Li et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,517,403 B1 | 12/2016 | Kim et al. |
| 9,544,257 B2 | 1/2017 | Ogundokun et al. |
| 9,576,201 B2 | 2/2017 | Wu et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,633,447 B2 | 4/2017 | Swaminathan et al. |
| 9,645,394 B2 | 5/2017 | Kinnebrew et al. |
| 9,648,376 B2 | 5/2017 | Chang et al. |
| 9,652,897 B2 | 5/2017 | Osborn et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,789,403 B1 | 10/2017 | Furment et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,173,141 B1 | 1/2019 | Schindler et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,318,034 B1 | 6/2019 | Hauenstein et al. |
| 10,362,219 B2 | 7/2019 | Wilson et al. |
| 10,387,730 B1 | 8/2019 | Cowburn et al. |
| 10,475,225 B2 | 11/2019 | Park et al. |

(56) References Cited

U.S. PATENT DOCUMENTS

| | | |
|---|---|---|
| 10,504,266 B2 | 12/2019 | Blattner et al. |
| 10,504,287 B2 | 12/2019 | McPhee et al. |
| 10,529,109 B1 | 1/2020 | Chen et al. |
| 10,573,048 B2 | 2/2020 | Ni et al. |
| 10,593,116 B2 | 3/2020 | Egri et al. |
| 10,657,701 B2 | 5/2020 | Osman et al. |
| 10,699,488 B1 | 6/2020 | Terrano |
| 10,740,978 B2 | 8/2020 | McPhee et al. |
| 10,990,246 B1 | 4/2021 | Law et al. |
| 11,030,813 B2 | 6/2021 | Hare et al. |
| 11,189,098 B2 | 11/2021 | Hare et al. |
| 11,195,338 B2 | 12/2021 | Mcphee et al. |
| 11,210,850 B2 | 12/2021 | Goodrich et al. |
| 11,232,646 B2 | 1/2022 | Goodrich et al. |
| 11,263,817 B1 | 3/2022 | Goodrich et al. |
| 11,275,252 B2 | 3/2022 | Boriskin et al. |
| 11,308,284 B2 | 4/2022 | Huang et al. |
| 11,443,491 B2 | 9/2022 | Hare et al. |
| 11,501,499 B2 | 11/2022 | Goodrich et al. |
| 11,620,791 B2 | 4/2023 | Goodrich et al. |
| 2002/0067362 A1 | 6/2002 | Agostino Nocera et al. |
| 2002/0169644 A1 | 11/2002 | Greene |
| 2004/0080467 A1 | 4/2004 | Chinthammit et al. |
| 2004/0212630 A1 | 10/2004 | Hobgood et al. |
| 2005/0041842 A1 | 2/2005 | Frakes et al. |
| 2005/0162419 A1 | 7/2005 | Kim et al. |
| 2005/0020661 A1 | 9/2005 | Cordelli |
| 2006/0294465 A1 | 12/2006 | Ronen et al. |
| 2007/0018811 A1 | 1/2007 | Gollu |
| 2007/0096678 A1 | 5/2007 | Melrose |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0078758 A1 | 4/2008 | Shimura et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0160779 A1 | 6/2009 | Crockett et al. |
| 2009/0177976 A1 | 7/2009 | Bokor et al. |
| 2009/0202114 A1 | 8/2009 | Morin et al. |
| 2009/0215536 A1 | 8/2009 | Yee et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2010/0251101 A1 | 9/2010 | Haussecker et al. |
| 2011/0093780 A1 | 4/2011 | Dunn |
| 2011/0115798 A1 | 5/2011 | Nayar et al. |
| 2011/0129118 A1* | 6/2011 | Hagbi .................. G06T 19/006 |
| | | 382/103 |
| 2011/0148864 A1 | 6/2011 | Lee et al. |
| 2011/0161242 A1 | 6/2011 | Chung et al. |
| 2011/0183732 A1 | 7/2011 | Block et al. |
| 2011/0202598 A1 | 8/2011 | Evans et al. |
| 2011/0239136 A1 | 9/2011 | Goldman et al. |
| 2012/0002014 A1 | 1/2012 | Walsh |
| 2012/0092329 A1 | 4/2012 | Koo et al. |
| 2012/0113106 A1 | 5/2012 | Choi et al. |
| 2012/0120186 A1 | 5/2012 | Diaz et al. |
| 2012/0124458 A1 | 5/2012 | Cruzada |
| 2012/0130717 A1 | 5/2012 | Xu et al. |
| 2012/0134588 A1 | 5/2012 | Zhang et al. |
| 2012/0146991 A1 | 6/2012 | Bala et al. |
| 2012/0194549 A1 | 8/2012 | Osterhout et al. |
| 2012/0206558 A1 | 8/2012 | Setton |
| 2012/0209924 A1 | 8/2012 | Evans et al. |
| 2012/0224773 A1 | 9/2012 | Sweet, III et al. |
| 2013/0021373 A1 | 1/2013 | Vaught et al. |
| 2013/0050258 A1 | 2/2013 | Liu et al. |
| 2013/0103760 A1 | 4/2013 | Golding et al. |
| 2013/0127980 A1 | 5/2013 | Haddick et al. |
| 2013/0141434 A1 | 6/2013 | Sugden et al. |
| 2013/0201187 A1 | 8/2013 | Tong et al. |
| 2013/0223673 A1 | 8/2013 | Davis et al. |
| 2013/0249948 A1 | 9/2013 | Reitan |
| 2013/0257877 A1 | 10/2013 | Davis |
| 2013/0278631 A1 | 10/2013 | Border et al. |
| 2014/0028713 A1 | 1/2014 | Keating et al. |
| 2014/0043329 A1 | 2/2014 | Wang et al. |
| 2014/0055554 A1 | 2/2014 | Du et al. |
| 2014/0078176 A1 | 3/2014 | Kim et al. |
| 2014/0080560 A1 | 3/2014 | Knutsson |
| 2014/0125678 A1 | 5/2014 | Wang et al. |
| 2014/0129343 A1 | 5/2014 | Finster et al. |
| 2014/0176608 A1 | 6/2014 | Boysen et al. |
| 2014/0026741 A1 | 9/2014 | Fein et al. |
| 2014/0270703 A1 | 9/2014 | Wang et al. |
| 2014/0321702 A1 | 10/2014 | Schmalstieg |
| 2014/0344762 A1 | 11/2014 | Grasset et al. |
| 2014/0351758 A1 | 11/2014 | Yoshida |
| 2015/0023602 A1 | 1/2015 | Wnuk et al. |
| 2015/0098614 A1 | 4/2015 | Gee et al. |
| 2015/0103183 A1 | 4/2015 | Abbott et al. |
| 2015/0206349 A1 | 7/2015 | Rosenthal et al. |
| 2015/0254467 A1 | 9/2015 | Leuthardt et al. |
| 2015/0262029 A1 | 9/2015 | Pirchheim et al. |
| 2015/0264304 A1 | 9/2015 | Chastney et al. |
| 2015/0269783 A1 | 9/2015 | Yun |
| 2015/0301599 A1 | 10/2015 | Miller |
| 2015/0309698 A1 | 10/2015 | Senderek et al. |
| 2015/0366527 A1 | 12/2015 | Yu et al. |
| 2016/0025978 A1 | 1/2016 | Mallinson |
| 2016/0054837 A1 | 2/2016 | Stafford |
| 2016/0063600 A1 | 3/2016 | Wuang |
| 2016/0073962 A1 | 3/2016 | Yu et al. |
| 2016/0085773 A1 | 3/2016 | Chang et al. |
| 2016/0109940 A1 | 4/2016 | Lyren et al. |
| 2016/0134840 A1 | 5/2016 | Mcculloch |
| 2016/0171739 A1 | 6/2016 | Anderson et al. |
| 2016/0234149 A1 | 8/2016 | Tsuda et al. |
| 2016/0292917 A1* | 10/2016 | Dorner .................. G06T 19/006 |
| 2016/0330522 A1 | 11/2016 | Newell et al. |
| 2016/0350967 A1 | 12/2016 | Klassen |
| 2016/0360115 A1 | 12/2016 | Rim |
| 2016/0379418 A1 | 12/2016 | Osborn et al. |
| 2017/0038829 A1 | 2/2017 | Lanier et al. |
| 2017/0039986 A1 | 2/2017 | Lanier et al. |
| 2017/0052946 A1 | 2/2017 | Gu et al. |
| 2017/0069134 A1 | 3/2017 | Shapira et al. |
| 2017/0080346 A1 | 3/2017 | Abbas |
| 2017/0087473 A1 | 3/2017 | Siegel et al. |
| 2017/0090747 A1 | 3/2017 | Dash |
| 2017/0103452 A1 | 4/2017 | Hertel et al. |
| 2017/0113140 A1 | 4/2017 | Blackstock et al. |
| 2017/0118145 A1 | 4/2017 | Aittoniemi et al. |
| 2017/0132821 A1 | 5/2017 | Valliani et al. |
| 2017/0178272 A1 | 6/2017 | Lashkari et al. |
| 2017/0199855 A1 | 7/2017 | Fishbeck |
| 2017/0221272 A1 | 8/2017 | Li et al. |
| 2017/0229153 A1 | 8/2017 | Moore et al. |
| 2017/0235848 A1 | 8/2017 | Van Deusen et al. |
| 2017/0243352 A1 | 8/2017 | Kutliroff et al. |
| 2017/0255450 A1 | 9/2017 | Mullins et al. |
| 2017/0278308 A1 | 9/2017 | Bleiweiss et al. |
| 2017/0287060 A1 | 10/2017 | Choi et al. |
| 2017/0310934 A1 | 10/2017 | Du et al. |
| 2017/0312634 A1 | 11/2017 | Ledoux et al. |
| 2017/0329488 A1 | 11/2017 | Welker et al. |
| 2017/0361225 A1 | 12/2017 | Goslin et al. |
| 2018/0005429 A1 | 1/2018 | Osman et al. |
| 2018/0040166 A1 | 2/2018 | Jayaraj et al. |
| 2018/0047200 A1 | 2/2018 | O'hara et al. |
| 2018/0061072 A1 | 3/2018 | Benezra et al. |
| 2018/0082117 A1 | 3/2018 | Sharma et al. |
| 2018/0082430 A1 | 3/2018 | Sharma et al. |

(56) References Cited

U.S. PATENT DOCUMENTS

| | | |
|---|---|---|
| 2018/0083978 A1 | 3/2018 | Pantazelos |
| 2018/0108179 A1 | 4/2018 | Tomlin et al. |
| 2018/0113587 A1 | 4/2018 | Allen et al. |
| 2018/0114364 A1 | 4/2018 | Mcphee et al. |
| 2018/0114365 A1 | 4/2018 | Egri et al. |
| 2018/0115503 A1 | 4/2018 | Baldwin et al. |
| 2018/0122142 A1 | 5/2018 | Egeler et al. |
| 2018/0143748 A1 | 5/2018 | Ahmed et al. |
| 2018/0143950 A1 | 5/2018 | Al-arnaouti et al. |
| 2018/0152400 A1 | 5/2018 | Chung et al. |
| 2018/0158250 A1 | 6/2018 | Yamamoto et al. |
| 2018/0160194 A1 | 6/2018 | Bayliss et al. |
| 2018/0174600 A1 | 6/2018 | Chaudhuri et al. |
| 2018/0189743 A1 | 7/2018 | Balasubramanian et al. |
| 2018/0197343 A1 | 7/2018 | Hare et al. |
| 2018/0210628 A1 | 7/2018 | Mcphee et al. |
| 2018/0276882 A1 | 9/2018 | Harviainen et al. |
| 2018/0285647 A1 | 10/2018 | Chen et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0330480 A1 | 11/2018 | Liu et al. |
| 2018/0336714 A1 | 11/2018 | Stoyles et al. |
| 2018/0345129 A1 | 12/2018 | Rathod |
| 2018/0349451 A1 | 12/2018 | O'connell et al. |
| 2019/0001223 A1 | 1/2019 | Blackstock et al. |
| 2019/0004688 A1 | 1/2019 | Bowen |
| 2019/0011703 A1 | 1/2019 | Robaina et al. |
| 2019/0057616 A1 | 2/2019 | Cohen et al. |
| 2019/0073834 A1 | 3/2019 | Holzer et al. |
| 2019/0107991 A1 | 4/2019 | Spivack et al. |
| 2019/0108578 A1 | 4/2019 | Spivack et al. |
| 2019/0188920 A1 | 6/2019 | Mcphee et al. |
| 2019/0221031 A1 | 7/2019 | De La Carcova et al. |
| 2019/0251720 A1 | 8/2019 | Hariton |
| 2019/0304189 A1 | 10/2019 | Falstrup et al. |
| 2019/0311341 A1 | 10/2019 | Rice |
| 2019/0342507 A1 | 11/2019 | Dye et al. |
| 2019/0385378 A1 | 12/2019 | Bastian et al. |
| 2020/0066014 A1 | 2/2020 | Mehta et al. |
| 2020/0066052 A1 | 2/2020 | Antonsen et al. |
| 2020/0074738 A1 | 3/2020 | Hare et al. |
| 2020/0082535 A1 | 3/2020 | Lindskog et al. |
| 2020/0105006 A1 | 4/2020 | Karsch et al. |
| 2020/0167995 A1 | 5/2020 | Hare et al. |
| 2020/0184731 A1 | 6/2020 | Egri et al. |
| 2020/0201514 A1 | 6/2020 | Murphy et al. |
| 2020/0202632 A1 | 6/2020 | Goodrich et al. |
| 2020/0327734 A1 | 10/2020 | Goodrich et al. |
| 2020/0334916 A1 | 10/2020 | Mcphee et al. |
| 2020/0380259 A1 | 12/2020 | Cahill et al. |
| 2020/0410763 A1 | 12/2020 | Hare et al. |
| 2021/0042993 A1 | 2/2021 | Tagra et al. |
| 2021/0074074 A1 | 3/2021 | Goodrich et al. |
| 2021/0132686 A1 | 5/2021 | Awaji |
| 2021/0174600 A1 | 6/2021 | Hare et al. |
| 2021/0241537 A1 | 8/2021 | Ahn |
| 2021/0256773 A1 | 8/2021 | Hare et al. |
| 2021/0264668 A1 | 8/2021 | Goodrich et al. |
| 2022/0044311 A1 | 2/2022 | Ray |
| 2022/0076504 A1 | 3/2022 | Goodrich et al. |
| 2022/0121874 A1 | 4/2022 | Mayes et al. |
| 2022/0375178 A1 | 11/2022 | Hare et al. |
| 2023/0142438 A1 | 5/2023 | Egri et al. |

FOREIGN PATENT DOCUMENTS

| | | |
|---|---|---|
| CN | 104764452 | 7/2015 |
| CN | 105607034 | 5/2016 |
| CN | 109863510 A | 6/2019 |
| CN | 109863532 A | 6/2019 |
| CN | 110168476 A | 8/2019 |
| CN | 110168478 A | 8/2019 |
| CN | 112639691 A | 4/2021 |
| CN | 113330484 A | 8/2021 |
| CN | 114026831 | 2/2022 |
| CN | 114341780 | 4/2022 |
| CN | 115933886 A | 4/2023 |
| EP | 2184092 A2 | 5/2010 |
| EP | 3086292 A1 | 10/2016 |
| EP | 3506213 A1 | 7/2019 |
| JP | 2001230801 A | 8/2001 |
| JP | 5497931 B2 | 3/2014 |
| KR | 20130119473 | 10/2013 |
| KR | 20140020871 | 2/2014 |
| KR | 101445263 B1 | 9/2014 |
| KR | 20150013709 A | 2/2015 |
| KR | 20150038272 A | 4/2015 |
| KR | 20150126938 | 11/2015 |
| KR | 20190075977 A | 7/2019 |
| KR | 102254709 B1 | 5/2021 |
| KR | 102257167 B1 | 5/2021 |
| KR | 102367928 | 3/2022 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2011109126 A1 | 9/2011 |
| WO | WO-2012139276 A1 | 10/2012 |
| WO | WO-201 3027893 A1 | 2/2013 |
| WO | WO-2013017991 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018081125 A1 | 5/2018 |
| WO | WO-2018102562 A1 | 6/2018 |
| WO | WO-2018128930 | 7/2018 |
| WO | WO-2018129531 | 7/2018 |
| WO | WO-2018129531 A1 | 7/2018 |
| WO | WO-2019089613 A1 | 5/2019 |
| WO | WO-2020047117 A1 | 3/2020 |
| WO | WO-2020132541 A1 | 6/2020 |
| WO | WO-2020264551 A2 | 12/2020 |
| WO | WO-2021003499 A1 | 1/2021 |
| WO | WO-2020264551 A3 | 2/2021 |
| WO | WO-2021046582 A1 | 3/2021 |

OTHER PUBLICATIONS

U.S. Appl. No. 17/527,376, filed Nov. 16, 2021, Context-Based Virtual Object Rendering.

U.S. Appl. No. 17/817,491, filed Aug. 4, 2022, 3D Object Camera Customization System.

"U.S. Appl. No. 15/581,994, Corrected Notice of Allowability dated Jan. 7, 2020", 2 pgs.

"U.S. Appl. No. 15/581,994, Corrected Notice of Allowability dated Feb. 18, 2020", 3 pgs.

"U.S. Appl. No. 15/581,994, Final Office Action dated Dec. 3, 2018", 18 pgs.

"U.S. Appl. No. 15/581,994, Non Final Office Action dated Jun. 6, 2019", 15 pgs.

"U.S. Appl. No. 15/581,994, Non Final Office Action dated Jun. 26, 2018", 14 pgs.

"U.S. Appl. No. 15/581,994, Notice of Allowance dated Nov. 6, 2019", 8 pgs.

"U.S. Appl. No. 15/581,994, Response filed Feb. 26, 2019 to Final Office Action dated Dec. 3, 2018", 11 pgs.

"U.S. Appl. No. 15/581,994, Response filed Sep. 26, 2018 to Non Final Office Action dated Jun. 26, 2018", 11 pgs.

"U.S. Appl. No. 15/581,994, Response filed Aug. 19, 2019 to Non-Final Office Action dated Jun. 6, 2019", 12 pgs.

"U.S. Appl. No. 15/863,575, Non Final Office Action dated Aug. 9, 2018", 14 pgs.

"U.S. Appl. No. 15/863,575, Notice of Allowance dated Nov. 15, 2018", 8 pgs.

"U.S. Appl. No. 15/863,575, Response filed Sep. 24, 2018 to Non Final Office Action dated Aug. 9, 2018", 9 pgs.

(56) References Cited

OTHER PUBLICATIONS

"U.S. Appl. No. 16/242,708, Corrected Notice of Allowability dated Feb. 23, 2021", 2 pgs.
"U.S. Appl. No. 16/242,708, Examiner Interview Summary dataed Jul. 29, 2020", 3 pgs.
"U.S. Appl. No. 16/242,708, Final Office Action dated Jul. 2, 2020", 25 pgs.
"U.S. Appl. No. 16/242,708, Non Final Office Action dated Feb. 28, 2020", 19 pgs.
"U.S. Appl. No. 16/242,708, Notice of Allowance dated Feb. 4, 2021", 7 pgs.
"U.S. Appl. No. 16/242,708, Notice of Allowance dated Aug. 19, 2020", 5 pgs.
"U.S. Appl. No. 16/242,708, Notice of Allowance dated Nov. 4, 2020", 7 pgs.
"U.S. Appl. No. 16/242,708, Response filed May 15, 2020 to Non Final Office Action dated Feb. 28, 2020", 11 pgs.
"U.S. Appl. No. 16/242,708, Response filed Aug. 5, 2020 to Final Office Action dated Jul. 2, 2020", 11 pgs.
"U.S. Appl. No. 16/283,482, Examiner Interview Summary dated Feb. 19, 2020", 3 pgs.
"U.S. Appl. No. 16/283,482, Final Office Action dated Dec. 16, 2019", 15 pgs.
"U.S. Appl. No. 16/283,482, Non Final Office Action dated Jun. 26, 2019", 13 pgs.
"U.S. Appl. No. 16/283,482, Notice of Allowance dated Apr. 2, 2020", 9 pgs.
"U.S. Appl. No. 16/283,482, Response filed Mar. 9, 2020 to Final Office Action dated Dec. 16, 2019", 11 pgs.
"U.S. Appl. No. 16/283,482, Response filed Sep. 26, 2019 to Non Final Office Action dated Jun. 26, 2019", 13 pgs.
"U.S. Appl. No. 16/457,461, Corrected Notice of Allowability dated Feb. 26, 2021", 2 pgs.
"U.S. Appl. No. 16/457,461, Examiner Interview Summary dated Jul. 10, 2020", 3 pgs.
"U.S. Appl. No. 16/457,461, Final Office Action dated Jul. 14, 2020", 16 pgs.
"U.S. Appl. No. 16/457,461, Non Final Office Action dated Apr. 16, 2020", 13 pgs.
"U.S. Appl. No. 16/457,461, Notice of Allowance dated Apr. 14, 2021", 7 pgs.
"U.S. Appl. No. 16/457,461, Notice of Allowance dated Jul. 28, 2021", 5 pgs.
"U.S. Appl. No. 16/457,461, Notice of Allowance dated Sep. 2, 2020", 7 pgs.
"U.S. Appl. No. 16/457,461, Notice of Allowance dated Nov. 19, 2020", 8 pgs.
"U.S. Appl. No. 16/457,461, Response filed Jul. 1, 2020 to Non Final Office Action dated Apr. 16, 2020", 9 pgs.
"U.S. Appl. No. 16/457,461, Response filed Aug. 20, 2020 to Final Office Action dated Jul. 14, 2020", 8 pgs.
"U.S. Appl. No. 16/696,600, 312 Amendment filed Jul. 7, 2021", 7 pgs.
"U.S. Appl. No. 16/696,600, Corrected Notice of Allowability dated May 12, 2021", 2 pgs.
"U.S. Appl. No. 16/696,600, Corrected Notice of Allowability dated Jul. 21, 2021", 3 pgs.
"U.S. Appl. No. 16/696,600, Non Final Office Action dated Sep. 15, 2020", 20 pgs.
"U.S. Appl. No. 16/696,600, Notice of Allowability dated Jan. 26, 2021", 2 pgs.
"U.S. Appl. No. 16/696,600, Notice of Allowance dated May 4, 2021", 9 pgs.
"U.S. Appl. No. 16/696,600, Notice of Allowance dated Dec. 18, 2020", 11 pgs.
"U.S. Appl. No. 16/696,600, Response filed Oct. 30, 2020 to Non Final Office Action dated Sep. 15, 2020", 8 pgs.
"U.S. Appl. No. 16/723,540, Examiner Interview Summary dated Jun. 16, 2021", 2 pgs.
"U.S. Appl. No. 16/723,540, Non Final Office Action dated Mar. 18, 2021", 15 pgs.
"U.S. Appl. No. 16/723,540, Response filed Jun. 16, 2021 to Non Final Office Action dated Mar. 18, 2021", 10 pgs.
"U.S. Appl. No. 16/747,318, Examiner Interview Summary dated Mar. 12, 2021", 2 pgs.
"U.S. Appl. No. 16/747,318, Final Office Action dated May 12, 2021", 14 pgs.
"U.S. Appl. No. 16/747,318, Non Final Office Action dated Dec. 15, 2020", 11 pgs.
"U.S. Appl. No. 16/747,318, Response filed Mar. 15, 2021 to Non Final Office Action dated Dec. 15, 2020", 11 pgs.
"U.S. Appl. No. 16/790,322, Examiner Interview Summary dated Jun. 14, 2021", 2 pgs.
"U.S. Appl. No. 16/790,322, Final Office Action dated May 3, 2021", 22 pgs.
"U.S. Appl. No. 16/790,322, Non Final Office Action dated Nov. 25, 2020", 21 pgs.
"U.S. Appl. No. 16/790,322, Response filed Feb. 25, 2021 to Non Final Office Action dated Nov. 25, 2020", 9 pgs.
"U.S. Appl. No. 16/922,618, Non Final Office Action dated Apr. 27, 2021", 9 pgs.
"U.S. Appl. No. 16/922,618, Notice of Allowance dated Aug. 4, 2021", 9 pgs.
"U.S. Appl. No. 16/922,618, Response filed Jun. 17, 2021 to Non Final Office Action dated Apr. 27, 2021", 7 pgs.
"European Application Serial No. 17835983.2, Response to Communication Pursuant to Rules 161(1) and 162 EPC filed Feb. 19, 2020", 11 pgs.
"European Application Serial No. 18713732.8, Response to Communication Pursuant to Rules 161(1) and 162 EPC filed Feb. 19, 2020", 25 pgs.
"European Application Serial No. 17865596.5, Extended European Search Report dated Sep. 13, 2019", 11 pgs.
"European Application Serial No. 17865596.5, Response filed Apr. 9, 2020 to Extended European Search Report dated Sep. 13, 2019", 21 pgs.
"European Application Serial No. 21153993.7, Extended European Search Report dated May 12, 2021", 9 pgs.
"International Application Serial No. PCT/US2017/058093, International Preliminary Report on Patentability dated May 9, 2019", 6 pgs.
"International Application Serial No. PCT/US2017/058093, International Search Report dated Jan. 4, 2018", 2 pgs.
"International Application Serial No. PCT/US2017/058093, Written Opinion dated Jan. 4, 2018", 4 pgs.
"International Application Serial No. PCT/US2017/068988, International Preliminary Report on Patentability dated Jul. 18, 2018", 8 pgs.
"International Application Serial No. PCT/US2017/068988, International Search Report dated Apr. 5, 2018", 3 pgs.
"International Application Serial No. PCT/US2017/068988, Written Opinion dated Apr. 5, 2018", 6 pgs.
"International Application Serial No. PCT/US2018/012967, International Preliminary Report on Patentability dated Jul. 18, 2019", 8 pgs.
"International Application Serial No. PCT/US2018/012967, International Search Report dated May 15, 2018", 5 pgs.
"International Application Serial No. PCT/US2018/012967, Written Opinion dated May 15, 2018", 6 pgs.
"International Application Serial No. PCT/US2019/048597, International Preliminary Report on Patentability dated Mar. 11, 2021", 10 pgs.
"International Application Serial No. PCT/US2019/048597, International Search Report dated Dec. 2, 2019", 5 pgs.
"International Application Serial No. PCT/US2019/048597, Written Opinion dated Dec. 2, 2019", 8 pgs.
"International Application Serial No. PCT/US2019/068007, International Preliminary Report on Patentability dated Jul. 1, 2021", 17 pgs.
"International Application Serial No. PCT/US2019/068007, International Search Report dated Apr. 30, 2020", 10 pgs.

(56) References Cited

OTHER PUBLICATIONS

"International Application Serial No. PCT/US2019/068007, Invitation to Pay Additional Fees dated Mar. 11, 2020", 18 pgs.

"International Application Serial No. PCT/US2019/068007, Written Opinion dated Apr. 30, 2020", 15 pgs.

"International Application Serial No. PCT/US2020/070158, International Search Report dated Dec. 17, 2020", 5 pgs.

"International Application Serial No. PCT/US2020/070158, Invitation to Pay Additional Fees dated Oct. 1, 2020", 12 pgs.

"International Application Serial No. PCT/US2020/070158, Written Opinion dated Dec. 17, 2020", 12 pgs.

"International Application Serial No. PCT/US2020/070503, International Search Report dated Dec. 2, 2020", 5 pgs.

"International Application Serial No. PCT/US2020/070503, Written Opinion dated Dec. 2, 2020", 7 pgs.

"Korean Application Serial No. 10-2019-7023098, Notice of Preliminary Rejection dated Oct. 8, 2020", w/ English translation, 15 pgs.

"Korean Application Serial No. 10-2019-7023098, Response filed Jan. 8, 2021 to Notice of Preliminary Rejection dated Oct. 8, 2020", w/ English Claims, 19 pgs.

"Korean Application Serial No. 10-2021-7015384, Notice of Preliminary Rejection dated Jun. 11, 2021", With English translation, 13 pgs.

Giaccone, P R, et al., "Foreground-background segmentation by cellular neural networks", IEEE 15th International Conference on Pattern Recognition (ICPR-2000), vol. 2, (2000), 438-441.

Kawai, Norihiko, et al., "Diminished Reality Based on Image Inpainting Considering Background Geometry", IEEE transactions on visualization and computer graphics, 22(3), (Mar. 1, 2016), 1236-1247.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Marto, Anabela G R, et al., "DinofelisAR Demo: Augmented Reality Based on Natural Features", 12th Iberian Conference on Information Systems and Technologies (CISTI), Lisbon, Portugal, (Jun. 2017), 6 pgs.

Nakajima, Yoshikatsu, et al., "Semantic Object Selection and Detection for Diminished Reality Based on SLAM with Viewpoint Class", IEEE International Symposium on Mixed and Augmented Reality Adjunct Proceedings, (2017), 338-343.

Park, Jong-Seung, et al., "Virtual Object Placement in Video for Augmented Reality", Advances in Multimedia Information Processing—PCM 2005: 6th Pacific Rim Conference on Multimedia, Jeju Island, KR, Proceedings (vol. 3767). Springer, Berlin, DE, (2005), 13-24.

Park, Jungsik, et al., "[Poster] Interactive deformation of real objects", 2014 IEEE International Symposium on Mixed and Augmented Reality (ISMAR), (Sep. 10, 2014), 295-296.

Robinson, Ian, "Add 3D text to video footage", Adobe.com/Youtube video, [Online] Retrieved from the Internet: <URL: https://helpx.adobe.com/after-effects/how-to/add-3d-text-video-footage.html>, (Mar. 10, 2017), 360 pgs.; 15:22 min.

Salas-Morena, Renato F, et al., "Dense Planar SLAM", IEEE Intl. Symposium on Mixed and Augmented Reality (ISMAR), Munich, Germany, [Online] Retrieved from the Internet: <URL: http://www.doc.ic.ac.uk/~bglocker/pdfs/salas-moreno2014ismar.pdf>, (Jan. 1, 2014), 8 pgs.

Schettini, R, et al., "A segmentation algorithm for color images", Pattern Recognition Letters, Elsevier, Amsterdam, NL, vol. 14, No. 6, (Jun. 1, 1993), 499-506.

Shohei, Mori, et al., "A survey of diminished reality: Techniques for visually concealing, eliminating, and seeing through real objects", IPSJ Transactions on Computer Vision and Applications, vol. 9, No. 1, (Jun. 28, 2017), 14 pgs.

You, Suya, et al., "Hybrid Inertial and Vision Tracking for Augmented Reality Registration", Proceedings IEEE Virtual Reality (Cat. No. 99CB36316), (1999), 8 pgs.

"Chinese Application Serial No. 201880006129.X, Office Action dated Jan. 5, 2022", w/ English translation, 18 pgs.

"International Application Serial No. PCT/US2020/070503, International Preliminary Report on Patentability dated Mar. 17, 2022", 9 pgs.

"Korean Application Serial No. 10-2022-7005953, Notice of Preliminary Rejection dated Apr. 4, 2022", w/ English Translation, 13 pgs.

"U.S. Appl. No. 17/319,399, Non Final Office Action dated Apr. 22, 2022", 8 pgs.

"Chinese Application Serial No. 201880006129.X, Response filed Apr. 20, 2022 toOffice Action dated Jan. 5, 2022", 10 pgs.

"U.S. Appl. No. 16/723,540, Response filed Apr. 26, 2022 to Non Final Office Action dted Jan. 26, 2022", 10 pgs.

"U.S. Appl. No. 17/249,092, Notice of Allowance dated May 4, 2022", 12 pgs.

"U.S. Appl. No. 17/307,354, Non Final Office Action dated Jun. 24, 2022", 29 pgs.

"U.S. Appl. No. 16/723,540, Notice of Allowance dated Jun. 29, 2022", 5 pgs.

"Chinese Application Serial No. 201880006129.X, Office Action dated Jun. 17, 2022", wi English translation, 13 pgs.

"U.S. Appl. No. 17/319,399, Response filed Jul. 21, 2022 to Non Final Office Action dated Apr. 22, 2022", 8 pgs.

"U.S. Appl. No. 16/790,322, Notice of Allowance dated Jul. 27, 2022", 8 pgs.

"U.S. Appl. No. 17/249,092, Notice of Allowability dated Aug. 12, 2022", 2 pgs.

"U.S. Appl. No. 16/723,540, Supplemental Notice of Allowability dated Aug. 15, 2022", 8 pgs.

"U.S. Appl. No. 17/319,399, Notice of Allowance dated Aug. 25, 2022", 9 pgs.

"U.S. Appl. No. 16/790,322, Notice of Allowance dated Aug. 31, 2022", 8 pgs.

"Korean Application Serial No. 10-2022-7005953, Response filed Aug. 3, 2022 to Office Action dated Apr. 4, 2022", w/ English Claims, 20 pgs.

"Chinese Application Serial No. 201880006129, Response filed Aug. 29, 2022 to Office Action dated Jun. 17, 2022", w/ English Claims, 14 pgs.

"U.S. Appl. No. 17/307,354, Response filed Sep. 20, 2022 to Non Final Office Action dated Jun. 24, 2022", 13 pgs.

"U.S. Appl. No. 16/460,519, Advisory Action dated Mar. 9, 2021", 4 pgs.

"U.S. Appl. No. 16/460,519, Final Office Action dated Jan. 6, 2021", 33 pgs.

"U.S. Appl. No. 16/460,519, Non Final Office Action dated Mar. 17, 2021", 37 pgs.

"U.S. Appl. No. 16/460,519, Non Final Office Action dated Sep. 4, 2020", 27 pgs.

"U.S. Appl. No. 16/460,519, Notice of Allowance dated Jul. 12, 2021", 5 pgs.

"U.S. Appl. No. 16/460,519, Response filed Feb. 23, 2021 to Final Office Action dated Jan. 6, 2021", 10 pgs.

"U.S. Appl. No. 16/460,519, Response filed Jun. 15, 2021 to Non Final Office Action dated Mar. 17, 2021", 10 pgs.

"U.S. Appl. No. 16/460,519, Response filed Dec. 2, 2020 to Non Final Office Action dated Sep. 4, 2020", 10 pgs.

"U.S. Appl. No. 16/696,600, Corrected Notice of Allowability dated Sep. 8, 2021", 2 pgs.

"U.S. Appl. No. 16/696,600, Notice of Allowance dated Aug. 17, 2021", 8 pgs.

"U.S. Appl. No. 16/721,418, Final Office Action dated Aug. 4, 2021", 31 pgs.

"U.S. Appl. No. 16/721,418, Non Final Office Action dated Apr. 29, 2021", 28 pgs.

"U.S. Appl. No. 16/721,418, Response filed Jul. 28, 2021 to Non Final Office Action dated Apr. 29, 2021", 11 pgs.

"U.S. Appl. No. 16/721,418, Response filed Oct. 4, 2021 to Final Office Action dated Aug. 4, 2021", 12 pgs.

"U.S. Appl. No. 16/721,459, Non Final Office Action dated Apr. 15, 2021", 17 pgs.

"U.S. Appl. No. 16/721,459, Notice of Allowance dated Aug. 19, 2021", 10 pgs.

(56) References Cited

OTHER PUBLICATIONS

"U.S. Appl. No. 16/721,459, Response filed Jul. 6, 2021 to Non Final Office Action dated Apr. 15, 2021", 10 pgs.
"U.S. Appl. No. 16/723,540, Final Office Action dated Sep. 27, 2021", 18 pgs.
"U.S. Appl. No. 16/723,540, Non Final Office Action dated Jan. 26, 2022", 19 pgs.
"U.S. Appl. No. 16/723,540, Response filed Dec. 23, 2021 to Final Office Action dated Sep. 27, 2021", 10 pgs.
"U.S. Appl. No. 16/747,318, 312 Amendment filed Nov. 5, 2021", 7 pgs.
"U.S. Appl. No. 16/747,318, Corrected Notice of Allowability dated Dec. 22, 2021", 2 pgs.
"U.S. Appl. No. 16/747,318, Notice of Allowance dated Sep. 9, 2021", 6 pgs.
"U.S. Appl. No. 16/747,318, PTO Response to Rule 312 Communication dated Nov. 23, 2021", 3 pgs.
"U.S. Appl. No. 16/747,318, Response filed Aug. 12, 2021 to Final Office Action dated May 12, 2021", 11 pgs.
"U.S. Appl. No. 16/790,322, Corrected Notice of Allowability dated Feb. 15, 2022", 2 pgs.
"U.S. Appl. No. 16/790,322, Notice of Allowance dated Nov. 29, 2021", 8 pgs.
"U.S. Appl. No. 16/790,322, Response filed Aug. 2, 2021 to Final Office Action dated May 3, 2021", 10 pgs.
"European Application Serial No. 17835983.2, Communication Pursuant to Article 94(3) EPC dated Aug. 24, 2021", 7 pgs.
"European Application Serial No. 17865596.5, Communication Pursuant to Article 94(3) EPC dated Sep. 23, 2021", 6 pgs.
"European Application Serial No. 19769288.2, Response filed Sep. 29, 2021 to Communication Pursuant to Rules 161(1) and 162 EPC dataed Apr. 8, 2021", 24 pgs.
"European Application Serial No. 19845741.8 , Response to Communication Pursuant to Rules 161 and 162 EPC filed Feb. 3, 2022", 19 pgs.
"International Application Serial No. PCT/US2020/070158, International Preliminary Report on Patentability dated Jan. 6, 2022", 14 pgs.
"International Application Serial No. PCT/US2020/070230, International Search Report dated Nov. 5, 2020", 7 pgs.
"International Application Serial No. PCT/US2020/070230, Invitation to Pay Additional Fees dated Sep. 15, 2020", 16 pgs.
"International Application Serial No. PCT/US2020/070230, Written Opinion dated Nov. 5, 2020", 14 pgs.
"Korean Application Serial No. 10-2019-7014554, Final Office Action dated May 25, 2021", w/ English Translation, 6 pgs.
"Korean Application Serial No. 10-2019-7014554, Notice of Preliminary Rejection dated Nov. 27, 2020", w/ English Translation, 7 pgs.
"Korean Application Serial No. 10-2019-7014554, Response filed Jan. 27, 2021 to Notice of Preliminary Rejection dated Nov. 27, 2020", w/ English Translation of Claims, 18 pgs.
"Korean Application Serial No. 10-2019-7014554,Response filed Jun. 25, 2021 to Final Office Action dated May 25, 2021", w/ English Translation of Claims, 18 pgs.
"Korean Application Serial No. 10-2021-7014739, Notice of Preliminary Rejection dated May 29, 2021", w/ English translation, 9 pgs.
"Korean Application Serial No. 10-2021-7014739, Response filed Aug. 10, 2021 to Notice of Preliminary Rejection dated May 29, 2021", w/ English claims, 17 pgs.
"Korean Application Serial No. 10-2021-7015384, Response filed Oct. 7, 2021 to Notice of Preliminary Rejection dated Jun. 11, 2021", w/ English Claims, 17 pgs.
"Mirror my texture", C4dcafe, [Online] Retrieved from the Internet: <URL: https://www.c4dcafe.com/ipb/forums/topic/95957-mirror-my-texture/)>, (2016), 3 pgs.
"Mobile Keyboard", Unity User Manual, Website, historical copy retrieved from web archive: <https://web.archive.org/web/20181204043559/https://docs.unity3d.com/Manual/MobileKeyboard.html> on Apr. 20, 2021, (Dec. 4, 2018), 5 pgs.
Besancon, Lonni, "A Tangible Volume for Portable 3D Interaction", Youtube, [Online] Retrieved from the Internet: <URL: https://www.youtube.com/watch?v=LP7GG6t2j-g>, [Accessed May 28, 2021], (Sep. 28, 2016), 4 pgs.
Bikos, Marios, "Diploma Thesis(AR-Chess)—Gameplay (Virtual Object Manipulation)", Youtube, [Online] Retrieved from the Internet: <URL: https://www.youtube.com/watch?v=Ipb3xHwgLfU>, [Accessed May 28, 2021], (Jul. 3, 2015), 2 pgs.
Deepu, R, et al., "3D Reconstruction from Single 2D Image", International Journal of Latest Research in Engineering and Technology (IJLRET), 2(1), (Jan. 2016), 42-51.
Fuccella, Vittorio, et al., "Gestures and Widgets: Performance in Text Editing on Multi-Touch Capable Mobile Devices", ACM, CHI '13: Proceedings of the SIGCHI Conference on Human Factors in Computing Systems, (Apr. 2013), 2785-2794.
Keeler, Alice, "Google Slides: Make a Draggable Stack", Teacher Tech with Alice Keeler, [Online] Retrieved from the Internet: <URL: https://alicekeeer.com/2017/04/10/google-slides-make-draggable-stack/>, (2017), 9 pgs.
Long, et al., "Context-Aware Mixed Reality: A Framework for Ubiquitous Interaction", arXiv:1803.05541v1, Cornell University Library, Ithaca, NY, (Mar. 14, 2018), 11 pgs.
Pixovert, "Create Ray Traced 3D Text in After Effects CS6", Youtube Video, [Online] Retrieved from the Internet: <URL: https://www.youtube.com/watch?v=qGbVQRTrhXM>, (Mar. 24, 2013), 15 pgs.; 7:09 min.
Ranganathan, Parthasarathy, et al., "Energy-Aware User Interfaces and Energy-Adaptive Displays", IEEE, Computer, vol. 39, Issue 3, (Mar. 20, 2006), 31-38.
Wang, Nanyang, et al., "Pixel2mesh: Generating 3d mesh models from single rgb images", Proceedings of the European Conference on Computer Vision (ECCV); arXIv:1804.01654v2 [cs.CV], (2018), 16 pgs.
Ward, Caleb, "5 Creative Ways to Use Layer Stacking in After Effects", RocketStock Blog, [Online] Retrieved from the Internet: <URL: https://www.rocketstock.com/blog/5-creative-ways-use-layer-stacking-effects/>, (2015), 9 pgs.
Yang, Jie, et al., "A Real-Time Face Tracker", Proceedings of the 3rd IEEE Workshop on Applications of Computer Vision (WACV'96), (Dec. 4, 1996), 142-147.
U.S. Appl. No. 15/863,575 U.S. Pat. No. 10,242,503, filed Jan. 5, 2018, Surface Aware Lens.
U.S. Appl. No. 16/283,482 U.S. Pat. No. 10,740,978, filed Feb. 22, 2019, Surface Aware Lens.
U.S. Appl. No. 16/922,618, filed Jul. 7, 2020, Surface Aware Lens.
U.S. Appl. No. 15/581,994 U.S. Pat. No. 10,593,116, filed Apr. 28, 2017, Augmented Reality Object Manipulation.
U.S. Appl. No. 16/790,322, filed Feb. 13, 2020, Augmented Reality Object Manipulation.
U.S. Appl. No. 16/723,540, filed Dec. 20, 2019, Virtual Surface Modification.
U.S. Appl. No. 16/747,318, filed Jan. 20, 2020, Context-Based Virtual Object Rendering.
U.S. Appl. No. 16/696,600, filed Nov. 26, 2019, Rendering 3D Captions Within Real-World Environments.
U.S. Appl. No. 17/319,399, filed May 13, 2021, Rendering 3D Captions Within Real-World Environments.
U.S. Appl. No. 16/242,708 U.S. Pat. No. 11,030,813, filed Jan. 8, 2019, Video Clip Object Tracking.
U.S. Appl. No. 17/307,354, filed May 4, 2021, Video Clip Object Tracking.
U.S. Appl. No. 16/457,461, filed Jun. 28, 2019, 3D Object Camera Customization System.
U.S. Appl. No. 17/249,092, filed Feb. 19, 2021, 3D Object Camera Customization System.
"U.S. Appl. No. 15/792,347, Final Office Action dated Jul. 9, 2019", 13 pgs.
"U.S. Appl. No. 15/792,347, Non Final Office Action dated Mar. 21, 2019", 12 pgs.
"U.S. Appl. No. 15/792,347, Notice of Allowance dated Aug. 5, 2019", 9 pgs.

(56) References Cited

OTHER PUBLICATIONS

"U.S. Appl. No. 15/792,347, Response filed Apr. 22, 2019 to Non Final Office Action dated Mar. 21, 2019", 9 pgs.
"U.S. Appl. No. 15/792,347, Response filed Jul. 16, 2019 to Final Office Action dated Jul. 9, 2019", 9 pgs.
"U.S. Appl. No. 16/579,463, Non Final Office Action dated Oct. 21, 2019", 8 pgs.
"U.S. Appl. No. 16/579,463, Response filed Nov. 11, 2019 to Non Final Office Action dated Oct. 21, 2019", 10 pgs.
"U.S. Appl. No. 16/723,540, Amendment Under 37 C.F.R. 1.312 Filed Sep. 20, 2022", 8 pgs.
"U.S. Appl. No. 16/723,540, PTO Response to Rule 312 Communication dated Sep. 29, 2022", 2 pgs.
"U.S. Appl. No. 16/723,540, Supplemental Notice of Allowability dated Sep. 29, 2022", 2 pgs.
"U.S. Appl. No. 16/790,322, 312 Amendment filed Oct. 12, 2022", 8 pgs.
"U.S. Appl. No. 16/790,322, Corrected Notice of Allowability dated Oct. 27, 2022", 2 pgs.
"U.S. Appl. No. 16/790,322, Corrected Notice of Allowability dated Dec. 13, 2022", 2 pgs.
"U.S. Appl. No. 17/527,376, Non Final Office Action dataed Nov. 10, 2022", 20 pgs.
"Chinese Application Serial No. 201880006129.X, Response to Examiner Telephone Interview filed Sep. 22, 2022", With English machine translation, 102 pgs.
"European Application Serial No. 20775562.0, Response to Communication pursuant to Rules 161 and 162 filed Sep. 27, 2022", 23 pgs.
"U.S. Appl. No. 17/307,354, Final Office Action dated Dec. 29, 2022", 30 pgs.
"U.S. Appl. No. 17/319,399, Corrected Notice of Allowability dated Jan. 11, 2023", 2 pgs.
"Korean Application Serial No. 10-2022-7045427, Notice of Preliminary Rejection dated Mar. 13, 2023", w/ English Translation, 15 pgs.
"European Application Serial No. 23153345.6, Extended European Search Report dated May 8, 2023", 9 pgs.
Singh, Gurjinder, et al., "Ubiquitous hybrid tracking techniques for augmented reality applications", IEEE 2nd International Conference on Recent Advances in Engineering & Computational Science, (Dec. 21, 2015), 1-5.
"U.S. Appl. No. 17/817,491, Non Final Office Action dated May 10, 2023", 15 pgs.

* cited by examiner

SURFACE AWARE LENS

CLAIM OF PRIORITY

This application is a continuation of and claims the benefit of priority to U.S. patent application Ser. No. 16/922,618, filed on Jul. 7, 2020, which is a continuation of and claims the benefit of priority to U.S. patent application Ser. No. 16/283,482, filed on Feb. 22, 2019, which is a continuation of and claims the benefit of priority to U.S. patent application Ser. No. 15/863,575, filed on Jan. 5, 2018, which claims the benefit of priority to U.S. Provisional Patent Application Ser. No. 62/444,218, filed on Jan. 9, 2017, each of which are herein incorporated by reference in their entireties.

TECHNICAL FIELD

The present disclosure relates generally to visual presentations and more particularly to virtual object rendering within real world environments.

BACKGROUND

Virtual object rendering systems can be used to create engaging and entertaining augmented reality experiences, in which three-dimensional virtual object graphics content appears to be present in the real world. Such systems can be subject to presentation problems due to environmental conditions, user actions, unanticipated visual interruption between a camera and the object being rendered, and the like. This can cause a virtual object to disappear or otherwise behave erratically, which breaks the illusion of the virtual objects being present in the real world. For example, a virtual object rendering system may not present virtual objects in a consistent manner with respect to real world items as a user moves about through the real world.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging and imaging software and systems by rendering virtual three-dimensional items as if they exist in real world environments. For example, media overlays of virtual three-dimensional objects can be generated by the system and displayed in conjunction with real world environment content (e.g., images and/or video) generated by an image-capturing device (e.g., a digital camera).

In some embodiments, media overlays may also be generated that contain avatars or customized "Bitmojis" of users who exchange electronic communications, such as Short Message Service (SMS) or Multimedia Messaging Service (MMS) texts and emails. Such overlays may be automatically generated based on the history of communications between users, the users' locations, and events in which the users are engaged. The appearance of users' avatars or Bitmojis in such overlays may likewise be modified based on location and event information. In some embodiments, media overlays may be presented to a user in a gallery or carousel that includes customized avatars of the user and the user's friends/contacts.

Figure 1:
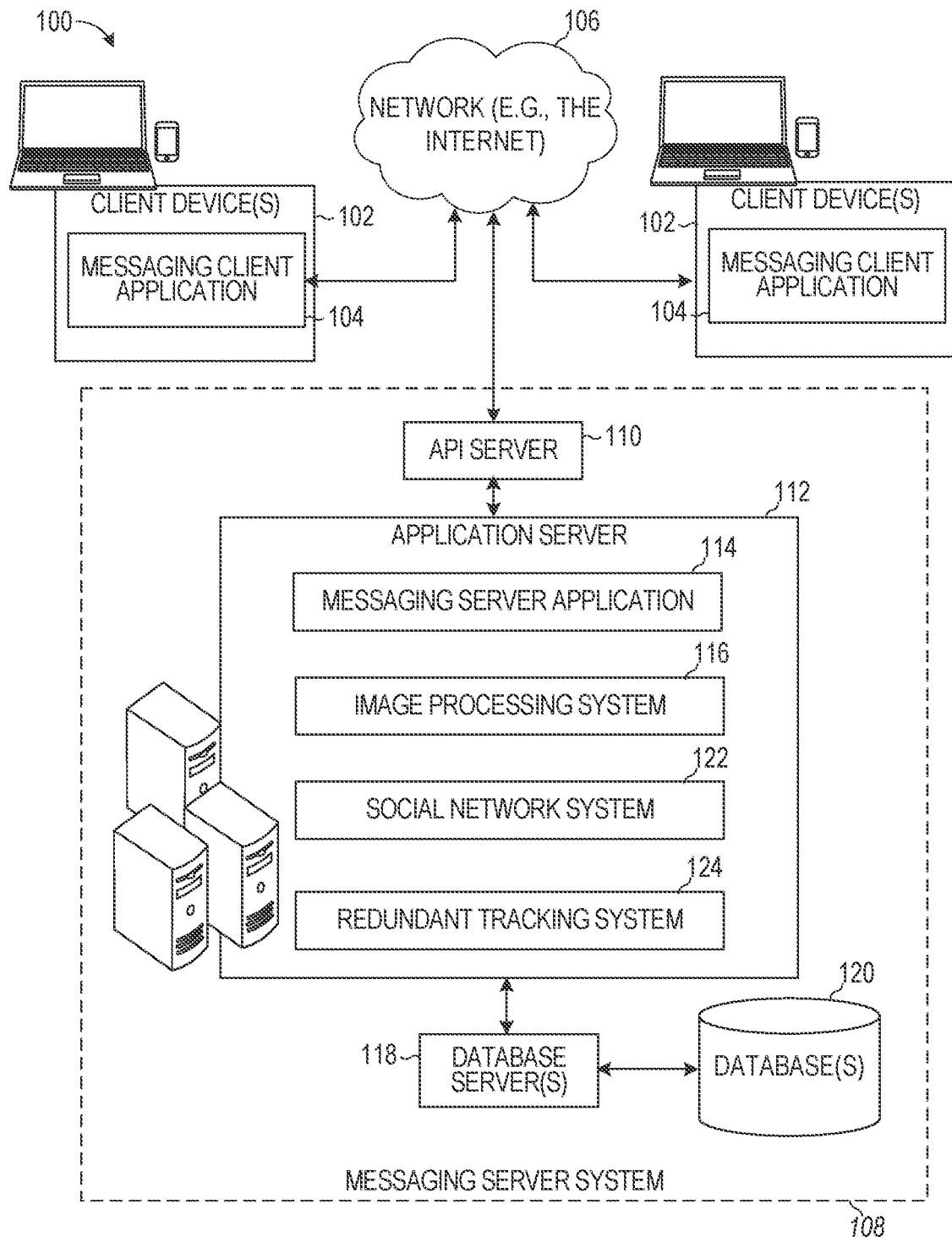
FIG. 1 is a block diagram showing an example messaging system for exchanging data (e.g., messages and associated content) over a network, according to example embodiments.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of such collections, the retrieval of a list of friends of a user of a client device 102, the retrieval of messages and content, the adding and deleting of friends to a social graph, the location of friends within a social graph, opening an application event (e.g., relating to the messaging client application 104).

The application server 112 hosts a number of applications and subsystems, including a messaging server application 114, an image processing system 116, a social network system 122, and a redundant tracking system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following," and also the identification of other entities and interests of a particular user.

The redundant tracking system 124 provides functionality to generate, display, and track virtual objects at positions relative to the client device 102, within a three-dimensional space. The redundant tracking system 124 comprises a set of tracking subsystems configured to track the virtual object at the position in three-dimensional space based on a set of tracking indicia, and transition between tracking subsystems. The redundant tracking system 124 may further transition between tracking with six degrees of freedom (6DoF) and tracking with three degrees of freedom (3DoF) based on an availability of the tracking indicia.

The application server 112 is communicatively coupled to a database server 118, which facilitates access to a database 120 in which is stored data associated with messages processed by the messaging server application 114.

Figure 2:
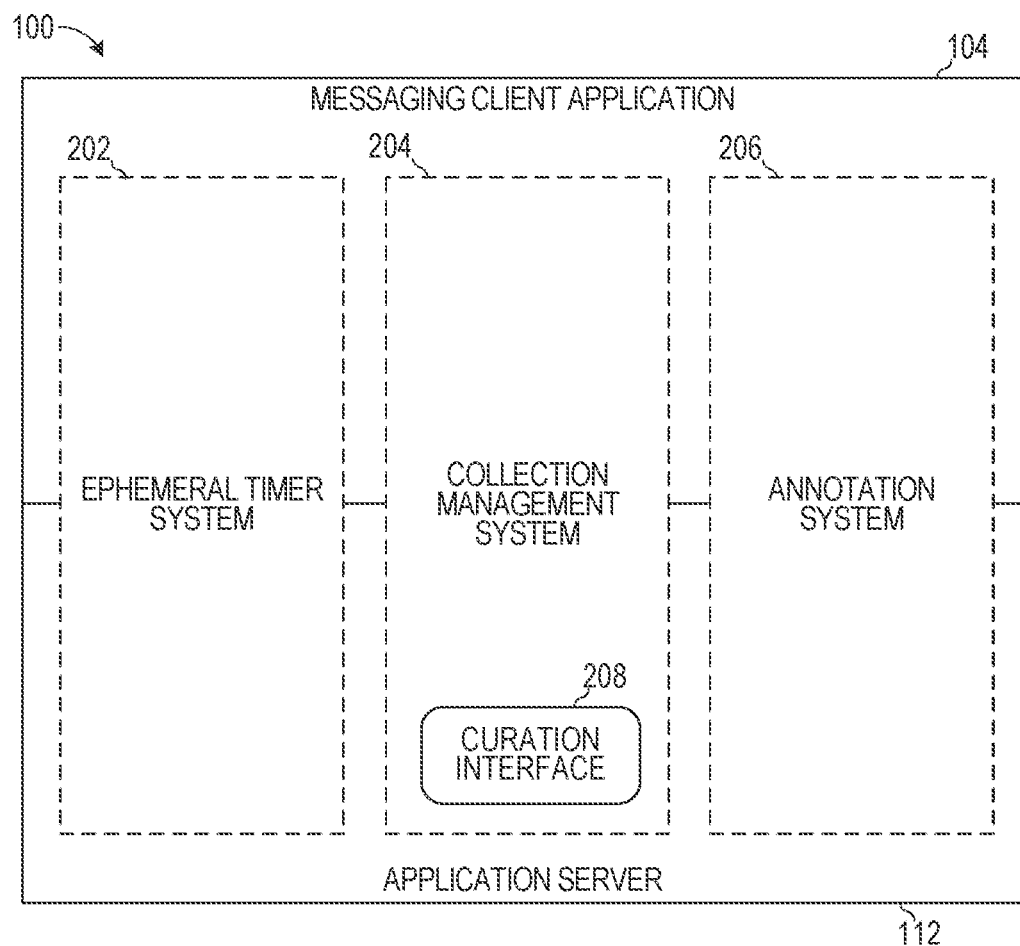
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
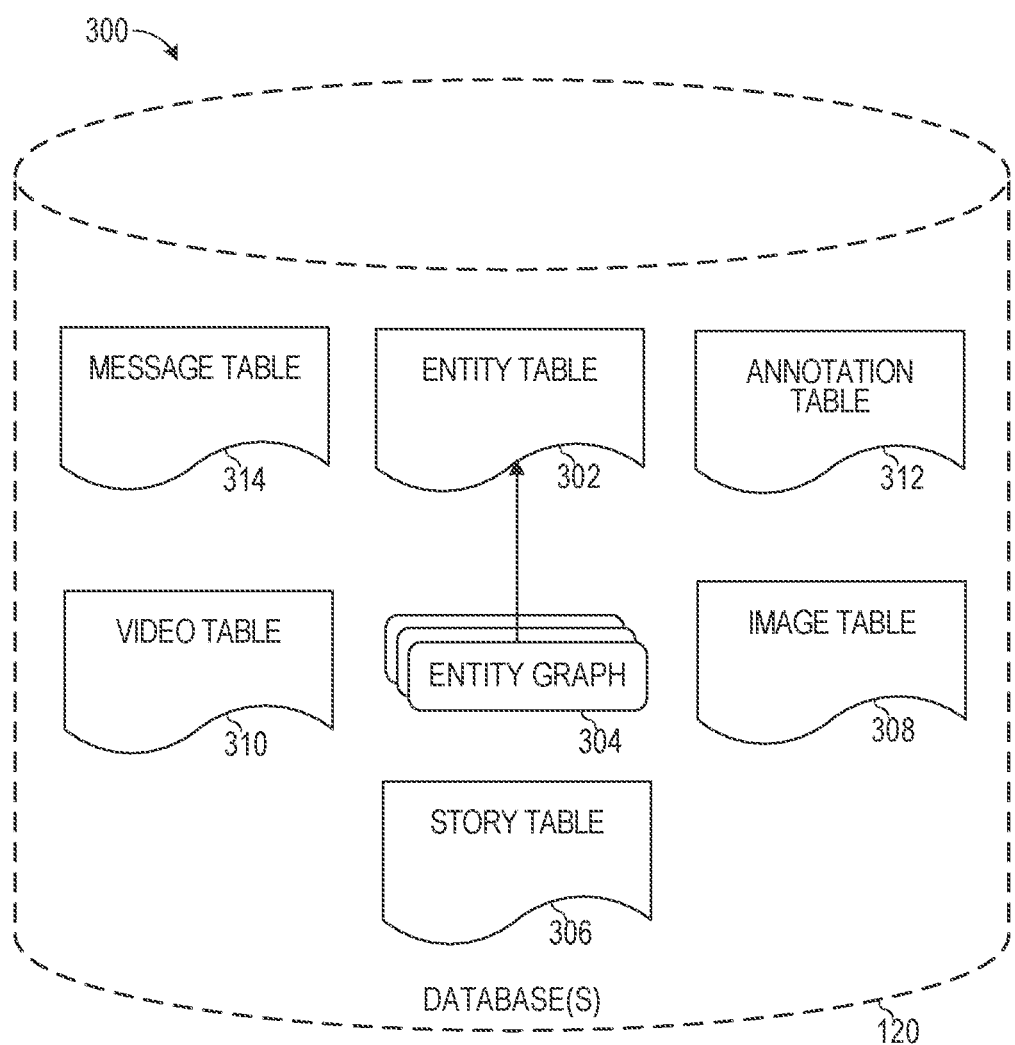
FIG. 3 is a schematic diagram illustrating data which may be stored in the database of the messaging server system, according to example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the UI of the messaging client application 104 may include an icon that is user selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users, whose client devices have location services enabled and are at a common location event at a particular time, may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
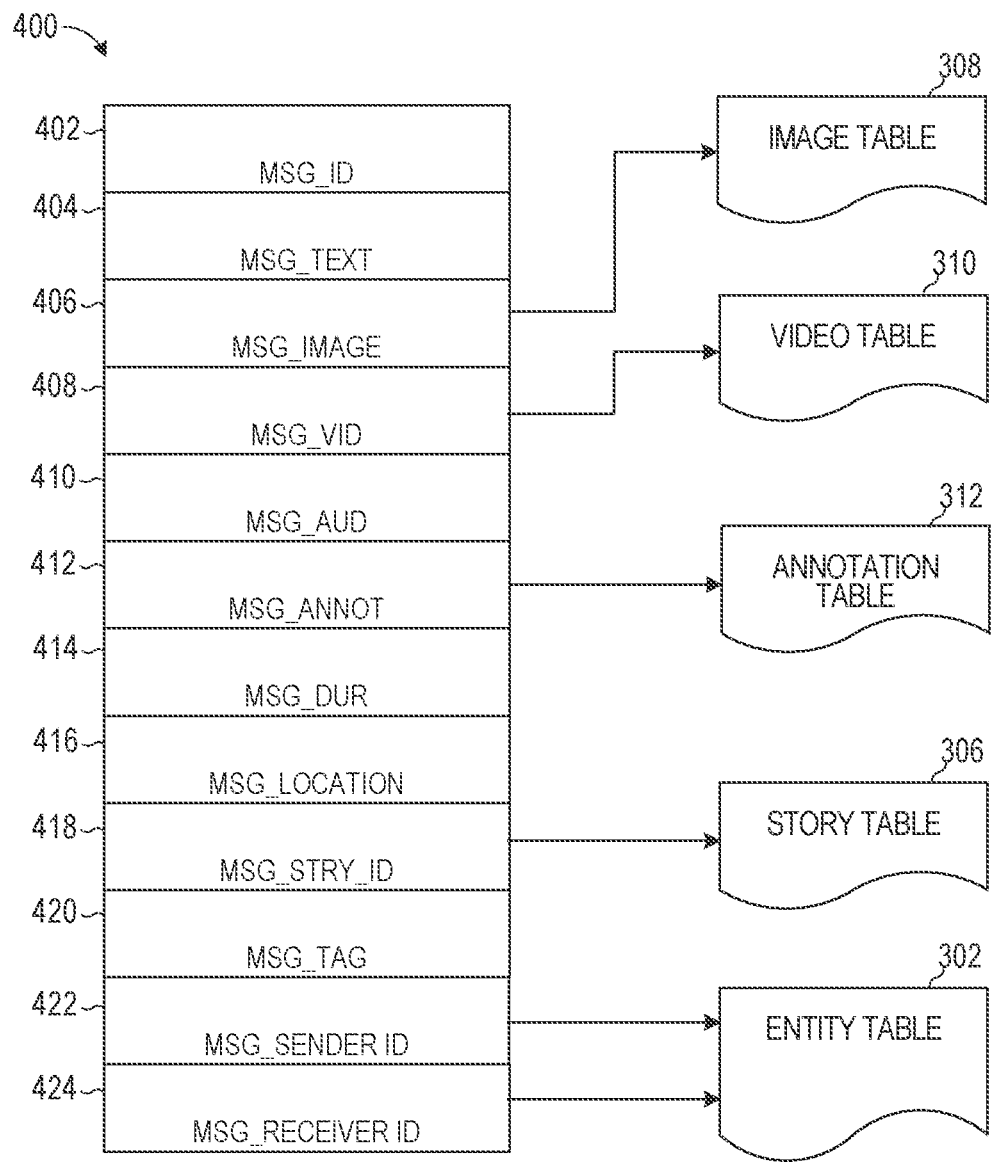
FIG. 4 is a schematic diagram illustrating a structure of a message generated by a messaging client application for communication, according to example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, with each of these parameter values being associated with respect to content items included in the content (e.g., a specific image into within the message image payload 406, or a specific video in the message video payload 408).
- A message story identifier 418: identifier value identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
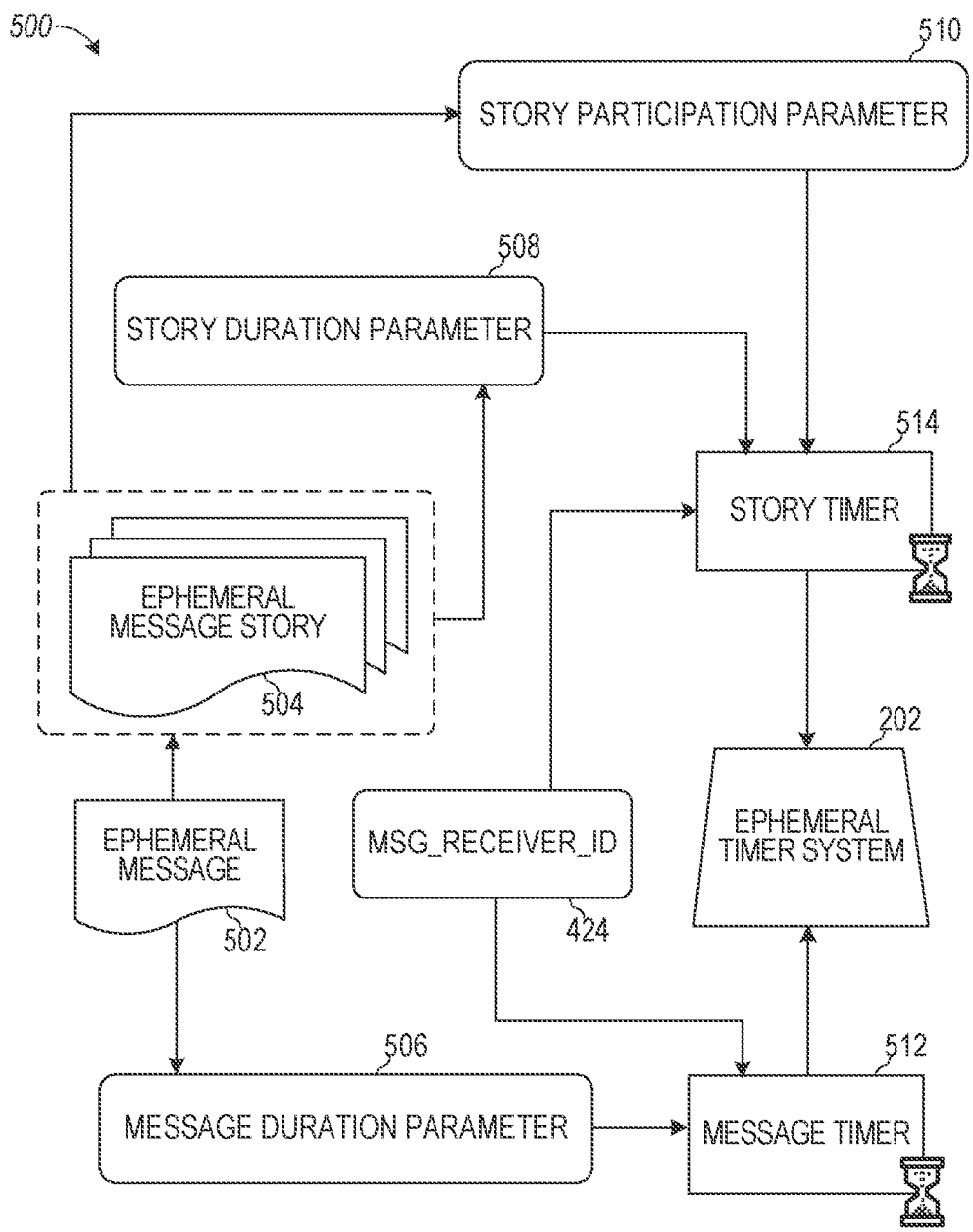
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504), may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
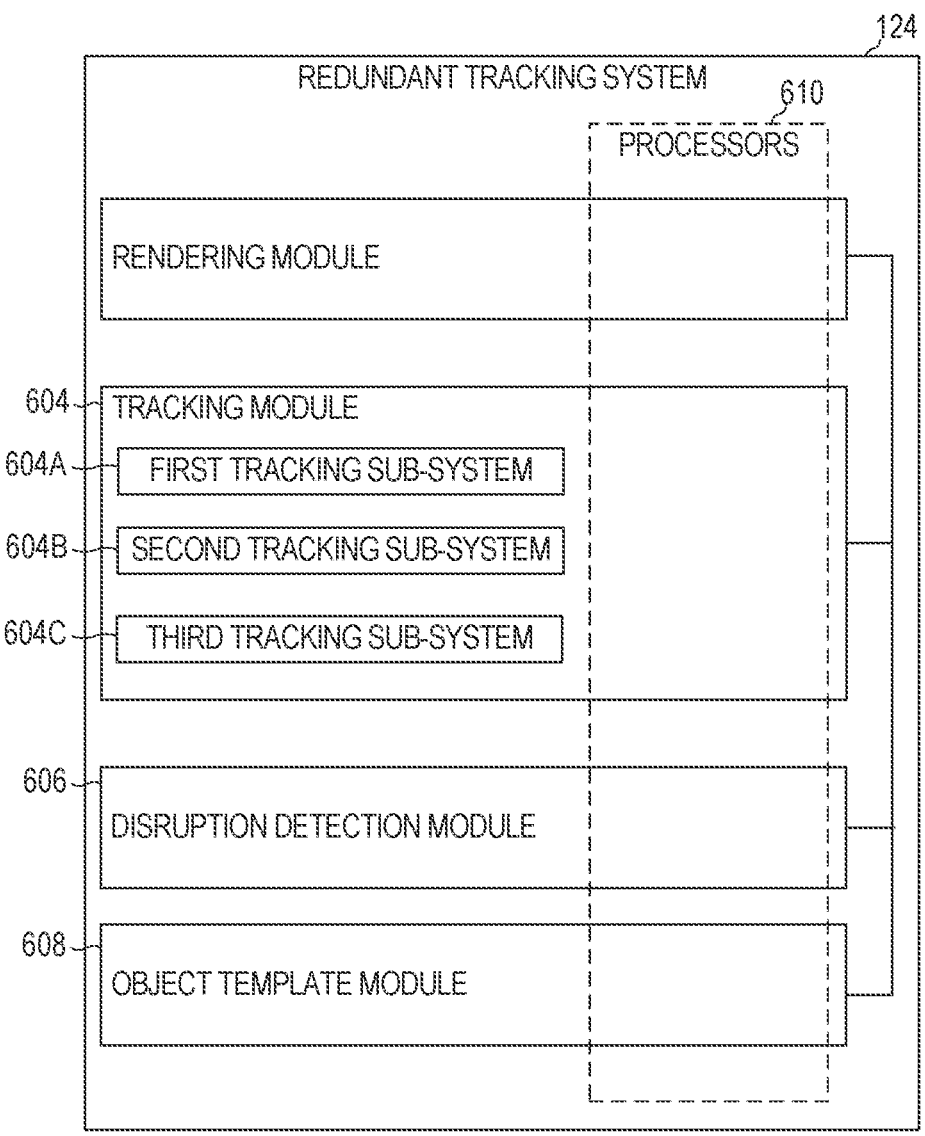
FIG. 6 is a block diagram illustrating various modules of a redundant tracking system 124, according to example embodiments.

FIG. 6 is a block diagram illustrating components of the redundant tracking system 124 that configure the redundant tracking system 124 to render a virtual object at a position relative to the client device 102 in a three-dimensional space, track the position of the virtual object in the three-dimensional space, and transition between tracking sub-systems based on an availability of tracking indicia, according to various example embodiments. The redundant tracking system 124 is shown as including a rendering module 602, a tracking module 604, a disruption detection module 606, and an object template module 608. In some example embodiments, the tracking module 604 may comprise a first tracking sub-system 604A, a second tracking sub-system 604B, and a third tracking sub-system 604C, wherein each tracking sub-system tracks the position of the virtual object within the three-dimensional space based on a set of tracking indicia. The various modules of the redundant tracking system 124 may be configured to communicate with each other (e.g., via a bus, shared memory, or a switch). Any one or more of these modules may be implemented using one or more processors 610 (e.g., by configuring such one or more processors to perform functions described for that module) and hence may include one or more of the processors 610.

Any one or more of the modules described may be implemented using hardware alone (e.g., one or more of the processors 610 of a machine) or a combination of hardware and software. For example, any module described of the redundant tracking system 124 may physically include an arrangement of one or more of the processors 610 (e.g., a subset of or among the one or more processors of the machine) configured to perform the operations described herein for that module. As another example, any module of the redundant tracking system 124 may include software, hardware, or both, that configure an arrangement of one or more processors 610 (e.g., among the one or more processors of the machine) to perform the operations described herein for that module. Accordingly, different modules of the redundant tracking system 124 may include and configure different arrangements of such processors 610 or a single arrangement of such processors 610 at different points in time. Moreover, any two or more modules of the redundant tracking system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
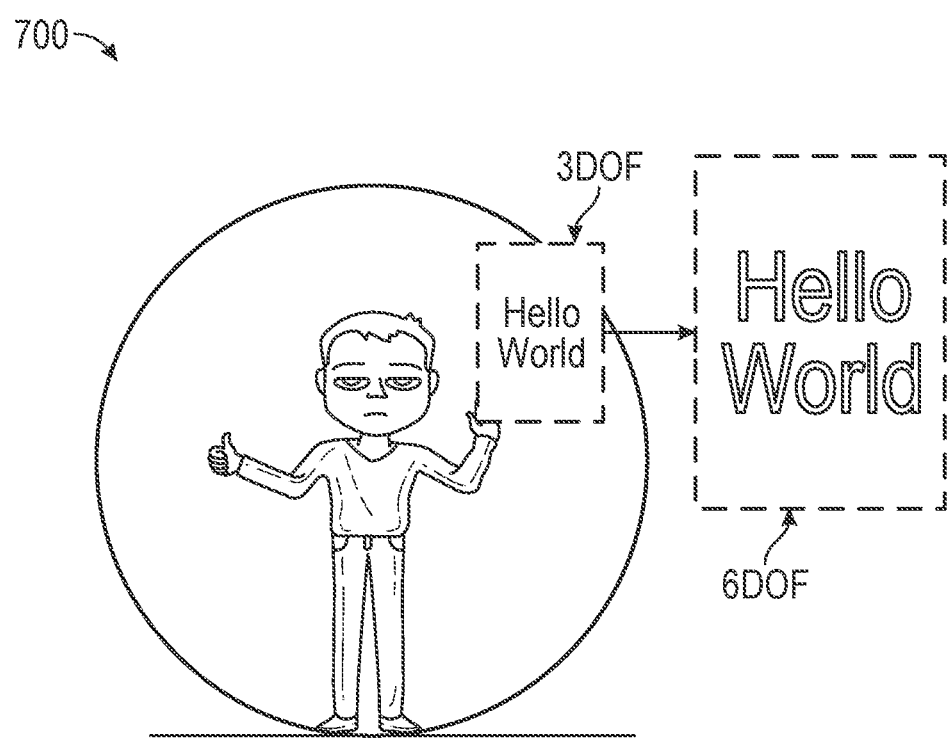
FIG. 7 is a diagram depicting an object rendered within a three-dimensional space by a redundant tracking system 124, according to example embodiments.

FIG. 7 is a diagram 700 depicting a virtual object rendered within a three-dimensional space by the redundant tracking system 124, according to certain example embodiments. As seen in FIG. 7, the virtual object may be tracked in 3DoF or 6DoF based on the tracking indicia available to the redundant tracking system 124.

Tracking systems are subject to frequent tracking failure due to environmental conditions, user actions, unanticipated visual interruption between camera and object/scene being tracked, and so forth. Traditionally, such tracking failures would cause a disruption in the presentation of virtual objects in a three-dimensional space. For example, the virtual objects may disappear or otherwise behave erratically, thereby interrupting the illusion of the virtual object being presented within the three-dimensional space. This undermines the perceived quality of the three-dimensional experience as a whole.

Traditional tracking systems rely on a single approach (Natural Feature Tracking (NFT), Simultaneous Localization And Mapping (SLAM), Gyroscopic, etc.) that each have breaking points in real world usage due to inaccurate sensor data, movement, loss or occlusion of visual marker, or dynamic interruptions to a scene. Further, each approach may have individual limitations in capability. For example, a gyroscopic tracking system can only track items with 3DoF. Further, utilization of a single tracking system provides inaccurate or unstable position estimation, due to inherent limitations of each individual system. For example, an NFT system may not provide sufficient pitch, yaw, or roll estimation due to the inaccuracies of visual tracking alone, while gyroscopic tracking systems provide inaccurate translation (up, down, left, right).

The redundant tracking system 124 comprising multiple redundant tracking sub-systems 604A-C that enable seamless transitions between such tracking sub-systems provides a solution to this problem by merging multiple tracking approaches into a single tracking system. This system is able to combine tracking virtual objects with 6DoF and 3DoF through combining and transitioning between multiple tracking systems based on the availability of tracking indicia tracked by the tracking systems. Thus, as the indicia tracked by any one tracking system becomes unavailable, the redundant tracking system 124 seamlessly switches between tracking in 6DoF and 3DoF, thereby providing the user with an uninterrupted experience. For example, in the case of visual tracking systems (e.g., NFT, SLAM), tracking indicia typically analyzed to determine orientation may be replaced with gyroscopic tracking indicia from a gyroscopic tracking system. This would thereby enable transitioning between tracking in 6Dof and 3DoF based on the availability of tracking indicia.

In some example embodiments, to transition between tracking in 6DoF and 3DoF, the redundant tracking system 124 gathers and stores tracking indicia within a tracking matrix that includes translation indicia (e.g., up, down, left, right) and rotation indicia (e.g., pitch, yaw, roll). The translation indicia gathered by an NFT system may thereby be extracted from the tracking matrix and utilized when future translation indicia gathered by the NFT system become inaccurate or unavailable. In the meantime, the rotation indicia is continued to be provided by the gyroscope. In this way, when the mobile device loses tracking indicia, the tracked objects that are presented in the three-dimensional space will not be changed abruptly at the frame when the tracking indicia are lost. Subsequently, when the target tracking object reappears in the screen, and a new translation $T_1$ is obtained, the translation part of the view matrix will then be taking advantage of the new translation $T_1$, and use $T_1$-$T_0$ as the translation of the view matrix.

The redundant tracking system 124 is configured to render and display virtual objects at a position in a three-dimensional space. For example, the redundant tracking system 124 may maintain a set of templates to generate virtual objects to be displayed in the three-dimensional space. Upon receiving a selection of a template from among the set of templates, and a selection of a position in the three-dimensional space, the redundant tracking system 124 generates and assigns the virtual object to the position within the three-dimensional space.

The redundant tracking system 124 may thereby track the position of the virtual object relative to a user device in the three-dimensional space by one or more tracking systems in 6DoF. For example, the one or more tracking systems of the redundant tracking system 124 may collect and analyze a set of tracking indicia (e.g., roll, pitch, yaw, natural features, etc.) in order to track the position of the virtual object relative to the user device in the three-dimensional space with 6DoF. In such embodiments, the redundant tracking system 124 may transition between tracking systems based on the availability of the tracked indicia to maintain consistent tracking in 6DoF.

Upon detecting an interruption of one or more indicia from among the set of indicia tracked, such that tracking in 6DoF becomes unreliable or impossible, the redundant tracking system 124 transitions to tracking the virtual object in the three-dimensional space in 3DoF in order to prevent an interruption of the display. For example, the redundant tracking system 124 may transition from a first tracking system (or first set of tracking systems among the set of tracking systems) to a second tracking system among the set of tracking systems (or second set of tracking systems), wherein the second tracking system is capable of tracking the virtual object with 3DoF in the three-dimensional space, based on the tracking indicia available.

In some example embodiments, the set of tracking systems of the redundant tracking system 124 includes a gyroscopic tracking system, an NFT system, and well as a SLAM tracking system. Each tracking system among the set of tracking systems may analyze tracking indicia in order to track a position of a virtual object within a three-dimensional space. For example, to track a virtual object with 6DoF, the redundant tracking system 124 may require at least six tracking indicia to be available. As tracking indicia become obstructed or unavailable for various reasons, the redundant tracking system 124 may transition between the available tracking systems among the set of tracking systems in order to maintain 6DoF, or transition to 3DoF if necessary.

It will be readily appreciated that these redundant tracking systems 124 serve to provide consistent rendered virtual objects in real world three-dimensional spaces in a wide variety of environments and situations. In many applications it can be desirable to provide firm consistency for the locations of these virtual objects as one or more users, cameras, or other tracking items move around in the environment. This can involve the recognition and use of a specific fixed reference point (e.g., a fixed surface) in the real world environment. Not using a fixed reference point or item can result in floating or other undesirable inconsistencies in the rendering and presentation of the virtual objects.

To ensure firm consistency in the location of virtual objects, annotation data in the example form of a presentation "lens" that is specific for the three-dimensional object tracking and rendering described herein may be employed. In particular, a "surface aware lens" is a presentation lens that identifies and references a real world surface (e.g., the ground) for the consistent rendering and presentation of virtual objects in three-dimensional space. Such a surface aware lens can be a specific portion or submodule within rendering module 602 of an overall redundant tracking system 124, as set forth above. This surface aware lens of rendering module 602 can be configured to recognize a reference surface based on visual camera content, and may also utilize other device inputs (e.g., gyroscope, accelerometer, compass) to determine what is an appropriate surface within a three-dimensional space captured by a camera view.

Once the reference surface has been determined, then virtual object rendering can be accomplished with respect to that reference surface.

The use of such a surface aware lens as part of an overall virtual object rendering can result in presentations that are more dynamically convincing even as a user or other content capturing device moves about in the three-dimensional space while the virtual objects are being created and rendered in real time. Various graphics of how such virtual object presentations can appear while using a surface aware lens will now be provided by way of example.

Figure 8:
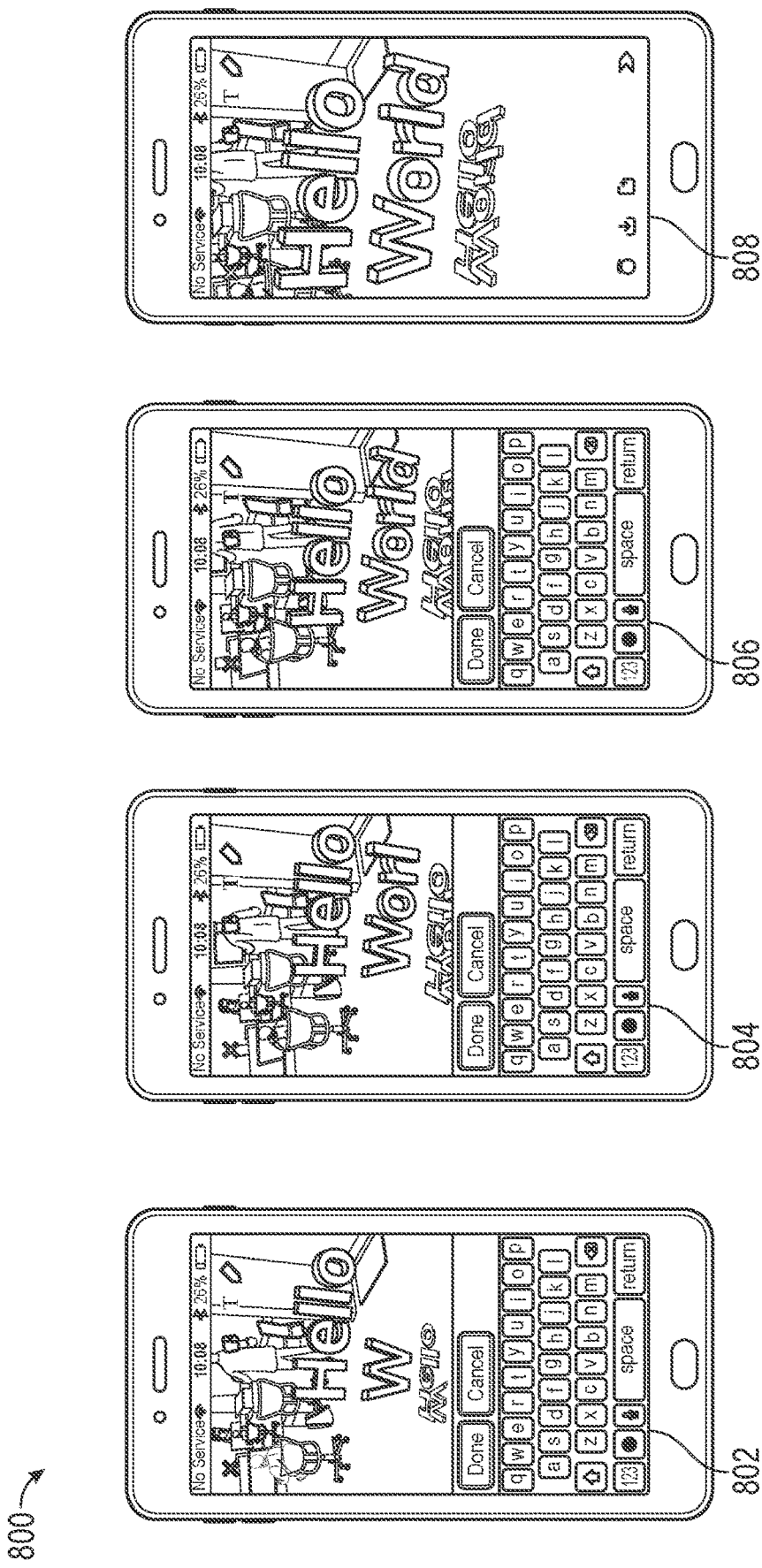
FIG. 8 provides screenshots in sequential order of an example object rendering within a real world three-dimensional space by a redundant tracking system 124 using a surface aware lens, according to example embodiments.

FIG. 8 provides screenshots in sequential order of an example object rendering within a real world three-dimensional space by a redundant tracking system 124 using a surface aware lens, according to various embodiments of the present disclosure. Sequence 800 includes several different screenshots 802, 804, 806, 808 of a virtual object presented in a real world three-dimensional space as the virtual object is being created and while the camera is moving with respect to the virtual object. For purposes of reference, the provided screenshots 802, 804, 806, 808 are taken several seconds apart in time. As shown in these screenshots, the virtual object presented is three-dimensional text that states "Hello World." The virtual object is shown as it is being created, which can be the result of user text input as the user moves with the camera device within the real world space, for example.

One particular feature that is illustrated in FIG. 8 is the general usage of a reference surface by the redundant tracking system 124 in rendering the virtual object. Again, the reference surface is used by the redundant tracking system 124 as a fixed surface within the three-dimensional space from which to render the virtual object or objects. In this example, the floor of the indoor location is being used as the reference surface for rendering the virtual object. As shown, the virtual object is rendered and maintained at a set distance from the reference surface, and need not contact the reference surface itself. In fact, the system provides a virtual or simulated "shadow" of the virtual object right at the floor surface location that is being used as the reference surface.

In many situations, such a reference item may simply be the ground or the floor where the user or image capturing device is located. Using the ground as the reference item for a surface aware lens that is "rendering virtual content relative to the ground" can be fairly simple, convenient, and consistent. It will be readily appreciated, however, that other surfaces can also be used for the surface aware lens. Such surfaces could be, for example, walls, ceilings, counters, tabletops, and other relatively identifiable and fixed items. Further examples show how such alternative surfaces might appear.

Figure 9:
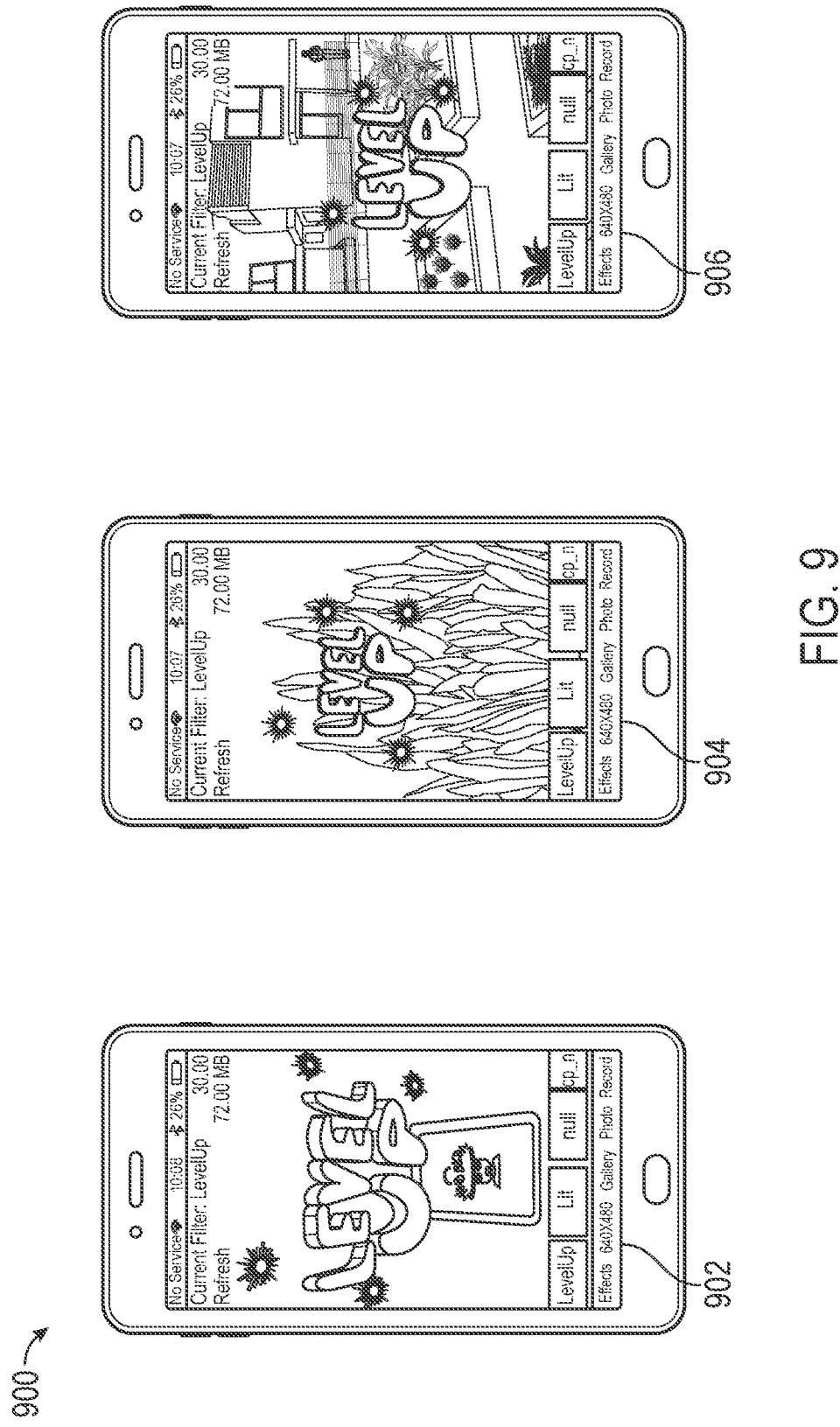
FIG. 9 provides screenshots of an example rendered object at different real world three-dimensional locations by a redundant tracking system 124 using a surface aware lens, according to example embodiments.

FIG. 9 provides screenshots of an example rendered object at different real world three-dimensional locations by a redundant tracking system 124 using a surface aware lens, according to various embodiments of the present disclosure. Series 900 includes several different screenshots 902, 904, 906, of the same virtual object statically presented in different real world three-dimensional locations. As shown in these screenshots, the virtual object presented is three-dimensional text that states "Level Up" in multiple colors. The same virtual object is shown as it has been rendered with respect to, for example, a countertop, an outside wall, and above an outside walkway. Each screenshot involves the use of different type of reference surface.

Figure 10:
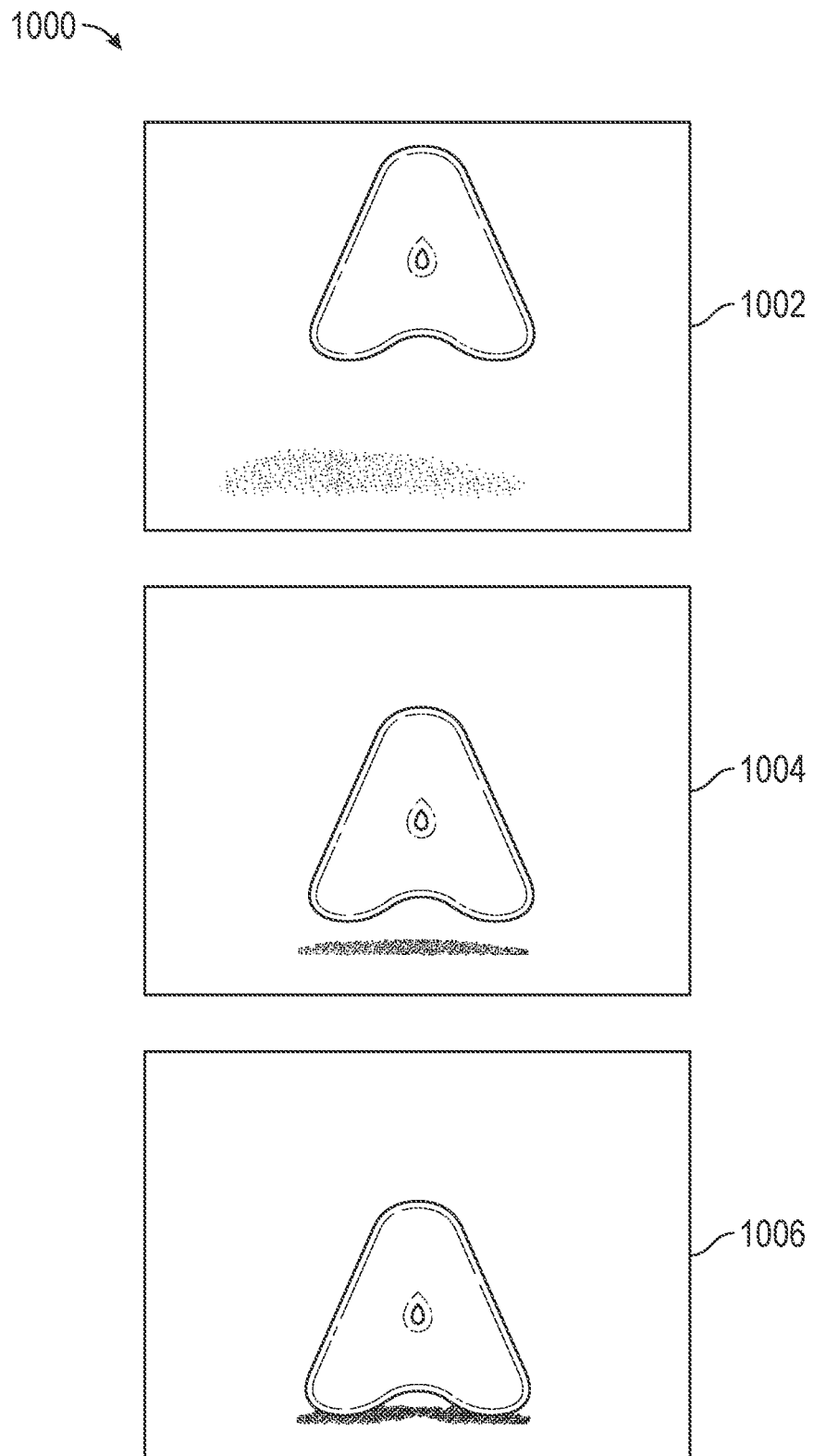
FIG. 10 provides screenshots in sequential order of an example object rendering within an abstract three-dimensional space by a redundant tracking system 124 using a surface aware lens, according to example embodiments.

FIG. 10 provides screenshots in sequential order of an example object rendering within an abstract three-dimensional space by a redundant tracking system 124 using a surface aware lens, according to various embodiments of the present disclosure. Sequence 1000 includes several different screenshots 1002, 1004, 1006 of a virtual object as the virtual object drops or falls toward its reference surface. As shown in these screenshots, the virtual object presented is a three-dimensional letter "A," which also animates as it falls. Consistent with some embodiments, the redundant tracking system 124 may transition from tracking the virtual object using a first tracking subsystem (e.g., a gyroscopic tracking system) when the virtual object is being viewed as it is dropping or falling to tracking the virtual object using a second tracking subsystem (e.g., a visual tracking system) when it is being viewed at the reference surface after dropping or falling. Various animation features, sizes, fonts, colors, and so forth can be user selectable, as set forth in greater detail below. Sequence 1000 represents what the virtual object rendering system creates without any real world backdrop, for example.

Figure 11:
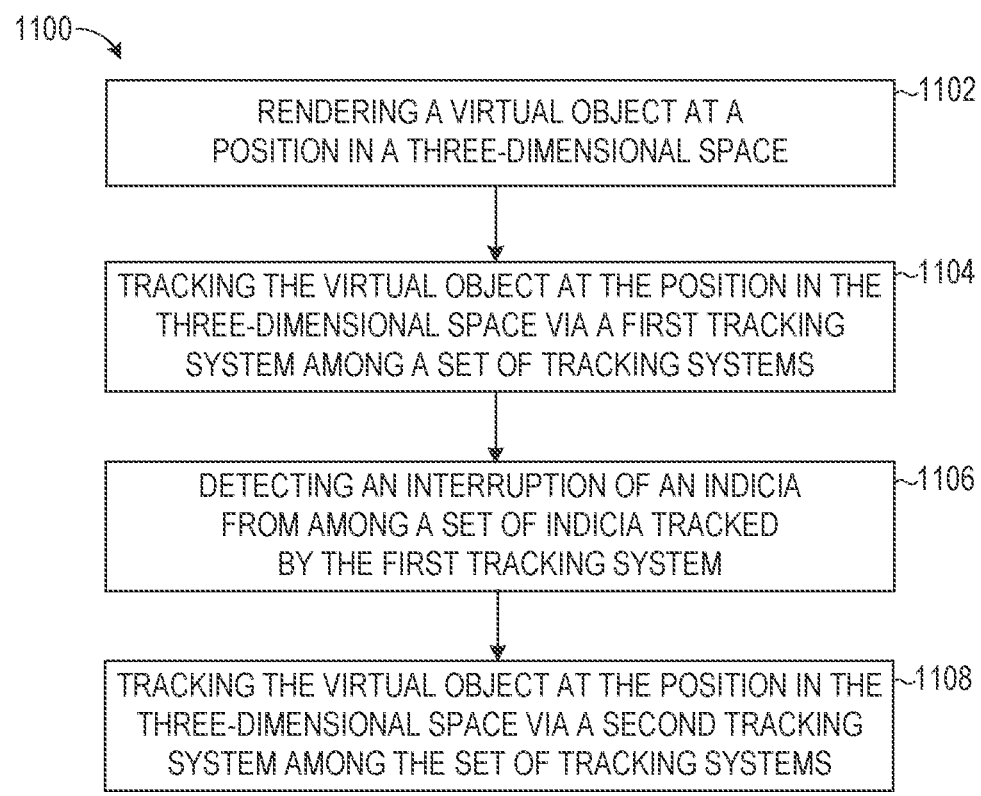
FIG. 11 is a flowchart illustrating a method for tracking an object rendered in a three-dimensional space, according to example embodiments.

FIG. 11 is a flowchart illustrating operations of the redundant tracking system 124 in performing a method 1100 for tracking an object at a position relative to the client device 102 in a three-dimensional space, according to certain example embodiments. As shown in FIG. 11, one or more operations 1102, 1104, 1106, and 1108 may be performed as part (e.g., a precursor task, a subroutine, or a portion) of the method 1100, according to some example embodiments.

At operation 1102, the rendering module 602 renders a virtual object at a position relative to the client device 102 in a three-dimensional space. The virtual object may include interactive content generated by the user based on user provided parameters.

At operation 1104, the tracking module 604 tracks the virtual object in 6DoF at the position in the three-dimensional space via the first tracking sub-system 604A, or a combination of multiple tracking sub-systems (e.g., the first tracking sub-system 604A and the second tracking sub-system 604B), based on a set of tracking indicia. When tracking the virtual object in 6DoF, a user viewing the object on the client device 102 can turn or move in any direction without disrupting tracking of the object. For example, the tracking module 604 may track the position of the virtual object based on a combination of an NFT system and a gyroscopic tracking system.

At operation 1106, the disruption detection module 606 detects an interruption of a tracking indicia from among the tracking indicia tracked by the tracking sub-systems (e.g., the first tracking sub-system 604A). For example, the first tracking sub-system 604A may include a NFT system configured to rely on tracking indicia that include features of an environment or active light sources in proximity to annotated virtual objects within the environment (e.g., the ground's plane, or the horizon). The NFT system of the first tracking sub-system 604A may therefore rely on the positions of three or more known features in the environment to determine the position of the virtual object relative to the client device 102 in the three dimensional space. Should any one or more of the tracking indicia tracked by the first tracking sub-system 604A become obstructed or unavailable, the tracking of the virtual object in the three-dimensional space would become disrupted.

At operation 1108, in response to the disruption detection module 606 detecting a disruption of one or more tracking indicia, the tracking module 604 transitions to one or more other tracking sub-systems (e.g., the second tracking sub-system 604B and/or the third tracking sub-system 604C) to maintain tracking of the virtual object relative to the client device 102 in the three-dimensional space. In doing so, the redundant tracking system 124 may transition from 6DoF to 3DoF, wherein 3DoF measures pitch, roll, and yaw, but does not measure translations. As the tracking indicia again become available, the redundant tracking system 124 may thereby transition from 3DoF back to 6DoF. For example, when the NFT system becomes unavailable, the tracking module 604 may utilize the last tracking indicia gathered and tracked by the NFT system throughout the subsequent 3DoF experience.

Figure 12:
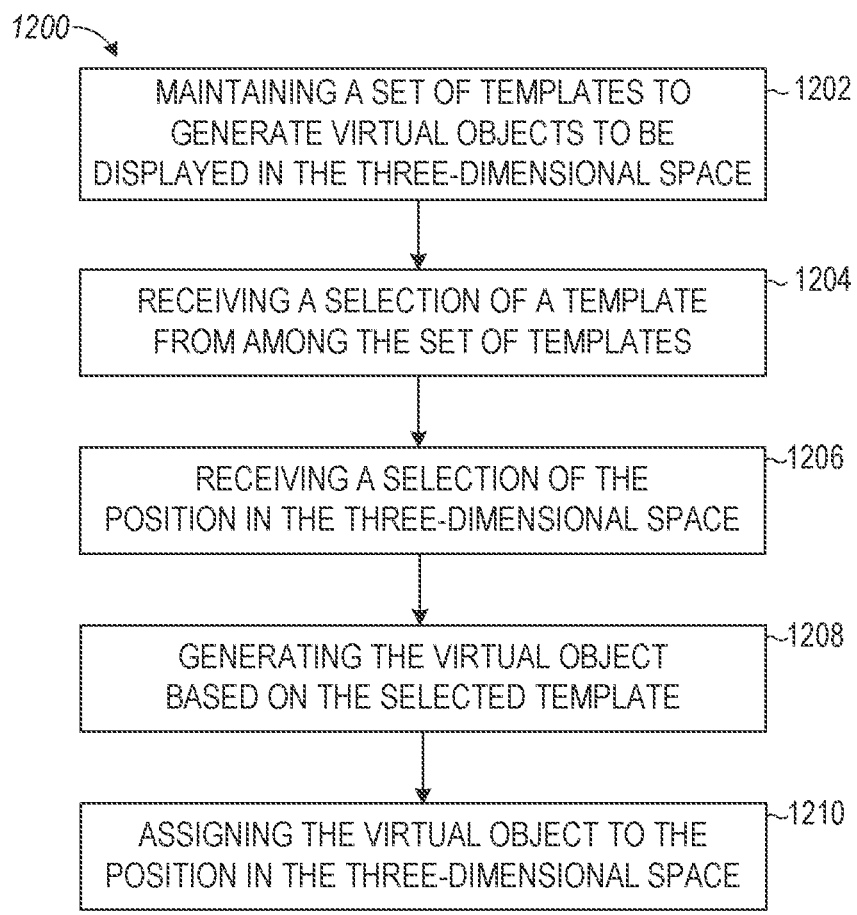
FIG. 12 is a flowchart illustrating a method for generating and rendering an object in a three-dimensional space, according to example embodiments.

FIG. 12 is a flowchart illustrating operations of the redundant tracking system 124 in performing a method 1200 for generating and presenting a virtual object at a position relative to the client device 102 in a three-dimensional space, according to certain example embodiments. As shown in FIG. 12, one or more operations 1202, 1204, 1206, 1208, and 1210 may be performed as part (e.g., a precursor task, a subroutine, or a portion) of the method 1200, according to some example embodiments.

As depicted in operation 1202, the object template module 608 maintains a set of templates for generating virtual objects to be displayed in a three-dimensional space. For example, the templates may include one or more object parameters that configure behaviors of the virtual object (e.g., sound sensitivity, position, movement, etc.). At operation 1204, the object template module 608 receives a selection of a template from among the set of templates maintained.

At operation 1206, the rendering module 602 receives a selection of a position in the three-dimensional space in which to render the virtual object. For example, by selecting the position, the rendering module 602 may identify tracking indicia to be used by the tracking module 604 in tracking the virtual object in the three-dimensional space. At operation 1208, the rendering module 602 generates the virtual object based on the selected template.

At operation 1210, the rendering module 602 assigns the virtual object to the position in three-dimensional space based on the selection and the tracking indicia identified. Having assigned the virtual object to the position relative to the client device 102 in three-dimensional space, the tracking module 604 may thereby track the virtual object in 6DoF based on the tracking indicia.

Figure 13:
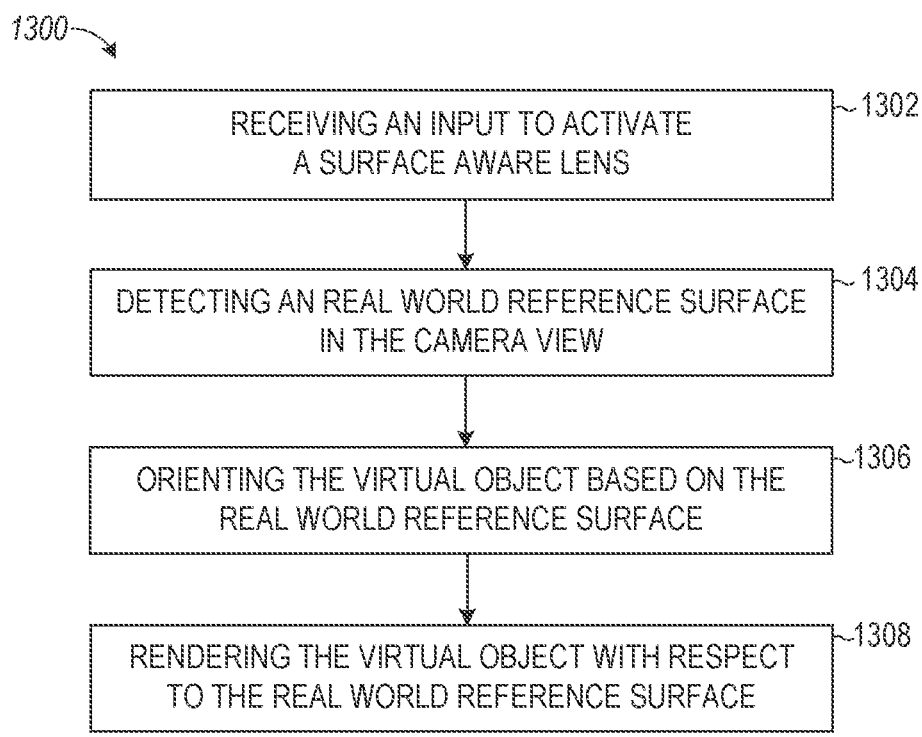
FIG. 13 is a flowchart illustrating a method for rendering a virtual object in a three-dimensional space using a surface aware lens, according to example embodiments.

FIG. 13 is a flowchart illustrating a method 1300 for rendering a virtual object in a three-dimensional space using a surface aware lens, according to various embodiments of the present disclosure. As shown in FIG. 13, one or more operations 1302, 1304, 1306, and 1308, may be performed as part (e.g., a precursor task, a subroutine, or a portion) of a specific surface aware lens or implementation within a rendering module 602 of a redundant tracking system 124 that provides object tracking and rendering aspects as detailed herein.

As depicted in operation 1302, a redundant tracking system 124 receives an input to activate a surface aware lens on the system. This input can be in the form of a manual user input, which can be, for example, a button tap or holding or pointing an active camera in such a manner so as to indicate that a surface is being referenced. The surface aware lens may used with any of the virtual objects for which a template is maintained by the object template module 608, although the surface aware lens is not limited in application to the virtual object templates maintained by the object template module 608.

At operation 1304, the surface aware lens of the rendering module 602 responds to the input by detecting a real world reference surface in the view presented by the camera. In some embodiments, the reference surface can be a user specified reference surface. As such, the detecting of the reference surface is based on user input such as a tap or other gesture used to activate the surface lens to indicate a reference surface. Such a reference surface can be the floor surface or the ground surface in many cases, although other fixed and ascertainable surfaces can also be used. For example, the surface aware lens of the rendering module 602 may determine the reference surface by identifying a fixed surface based on an analysis of visual camera content, and may also utilize other device inputs (e.g., gyroscope, accelerometer, compass) to ascertain what is an appropriate surface within a three-dimensional space captured by the camera view. In various embodiments, a confirmation that the proper reference surface has been indicated or highlighted can be requested from the user. In some situations, the system may indicate that a proper reference surface cannot be detected, such that further input or help from the user may be needed.

At operation 1306, the surface aware lens of the rendering module 602 orients a virtual object based on the detected reference surface. The orienting of the virtual object may include assigning the virtual object to a position in three-dimensional space based on the detected reference surface and identifying tracking indicia to be used by the tracking module 604 in tracking the virtual object in the three-dimensional space. The position to which the virtual object is assigned may correspond to the reference surface or a predefined distance above the reference surface. One or both of operations 1304 and 1306 can also be referred to as initialization of the rendering module 602. In essence, the determined reference surface within the camera view is being established in the rendering module 602 at a proper static orientation relative to the reference surface in the real world.

At operation 1308, the surface aware lens of the rendering module 602 renders the virtual object with respect to the reference surface. More specifically, the rendering of the virtual object with respect to the reference surface may include rendering and maintaining the virtual object at the assigned position within the three-dimensional space. Thus, in instances in which the assigned position is a predefined distance from the reference surface, the rendering of the virtual object may include rendering and maintaining the virtual object at the predefined distance from the reference surface. In these instances, the virtual object, when rendered, may not actually contact or rest against the reference surface, but rather may be hovering above or extending away from the reference surface at the predefined distance. Such a separation can be seen in the screenshots of FIG. 8, for example.

The rendering of the virtual object with respect to the reference surface may further include rendering a separate virtual representation related to the virtual object at the reference surface. The separate virtual representation may, for example, be a simulated shadow of the virtual object as shown in FIG. 8.

Figure 14:
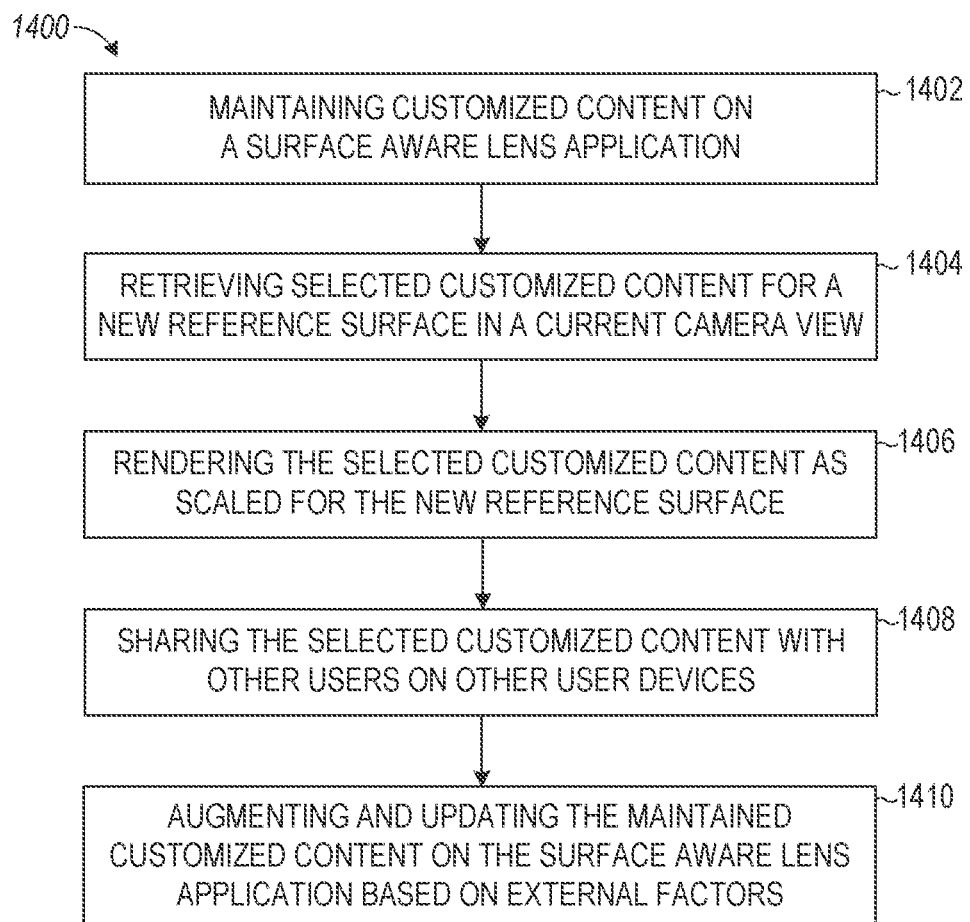
FIG. 14 is a flowchart illustrating a method for providing user customized virtual objects in a three-dimensional space using a surface aware lens, according to example embodiments.

FIG. 14 is a flowchart illustrating a method 1400 for providing customized virtual objects in a three-dimensional space using a surface aware lens, according to various embodiments of the present disclosure. As in the case of many "lens" implementations and features, the use of a surface aware lens can involve a user experience, such as by a service. As shown in FIG. 14, one or more operations 1402, 1404, 1406, 1408, and 1410 may be performed as part of a persistent surface aware lens program or service for ongoing provisions of the virtual object tracking and rendering aspects detailed herein. Although the provided operations may be performed at various locations by multiple entities (i.e., some server based and some client based), it will be understood that the various aspects can readily be ascertained and isolated to each specific location, system, and device as needed. For example, a method of providing customized content performed only at a local device might include all operations except for 1402. Such a local device only method might still involve maintaining a reduced cache of customized content on the local device in any event.

As depicted in operation 1402, a specific surface aware lens application or service can involve maintaining customized content. Thus, not only does an overall system provide for generic and readily available imagery, but separate user storage and group storage may exist for customized content. Such customized content can be user created, and can be stored and deleted according to various user preferences and selections. Customized content may also be created and made available for various users for temporal use based on seasons, newsworthy events, locations, and the like. As such, customized content may be created by specific users for themselves and possibly friends and family. Customized content may also be created by users for specific groups and organizations. All such customized content can generally be maintained on a system based surface aware lens application.

At operation 1404, the surface aware lens application or service can retrieve selected customized content according to a current use or request. This can involve the use of the same reference surface discussed above with respect to method 1300 or a new reference surface in a current camera view, for example. In many situations, this can involve one or more users wishing to access previously used content for use at a later time at a new or different location. This can be the private customized content of the requesting user for use at a different location, and could also be a request for customized publically available content.

At operation 1406, the surface aware lens at the local device can render the selected customized content as delivered by the application or service at the reference surface. This can involve several additional processes, such as scaling the customized content, as may be appropriate for a different reference surface. Such scaling may be performed by the surface aware lens application at the local device. Alternatively, such scaling may be done or assisted by the application or service providing the selected customized content.

At operation 1408, the surface aware lens application or service can share the selected customized content with other users on other user devices. Accordingly, user customized content, such as specific virtual objects, can persist from and be shared between different user devices. For example, the "Hello World" virtual object of FIG. 8 might be visible to every user of the providing service that happens by that particular location. In some situations, customized content may be shared only with a select group of users rather than everyone. In addition to there being system based sharing of customized content, there can also be peer-to-peer based sharing of such content. For example, two users may elect to share customized content only between each other. Such content sharing may be limited or expanded as desired by users, in terms of the amount of time, the types of content, and the users that are provided access.

At operation 1410, the surface aware lens application or service can allow for augmented and updated customized content that is maintained on the system. Such updated customized content can be based on external factors, such as the time, date, season, location, weather, holiday events, news events, presence of friends or other users, sports scores, and the like. Specific new user generated virtual objects can be provided and input into the system over time as well. It will be appreciated that a wide variety of customized content for such virtual objects is generally possible. One particular type of customized content for the general virtual objects provided herein can involve the use of personalized cartoon avatars or "Bitmojis." Such virtual objects can be referred to generally as personal avatars, whether provided by Bitmoji or any other particular entity. Various details regarding the specific application of these personal avatars as virtual objects are provided herein, and it will be understood that such details might also be applied to other types of virtual objects in other contexts or applications as well.

Figure 15:
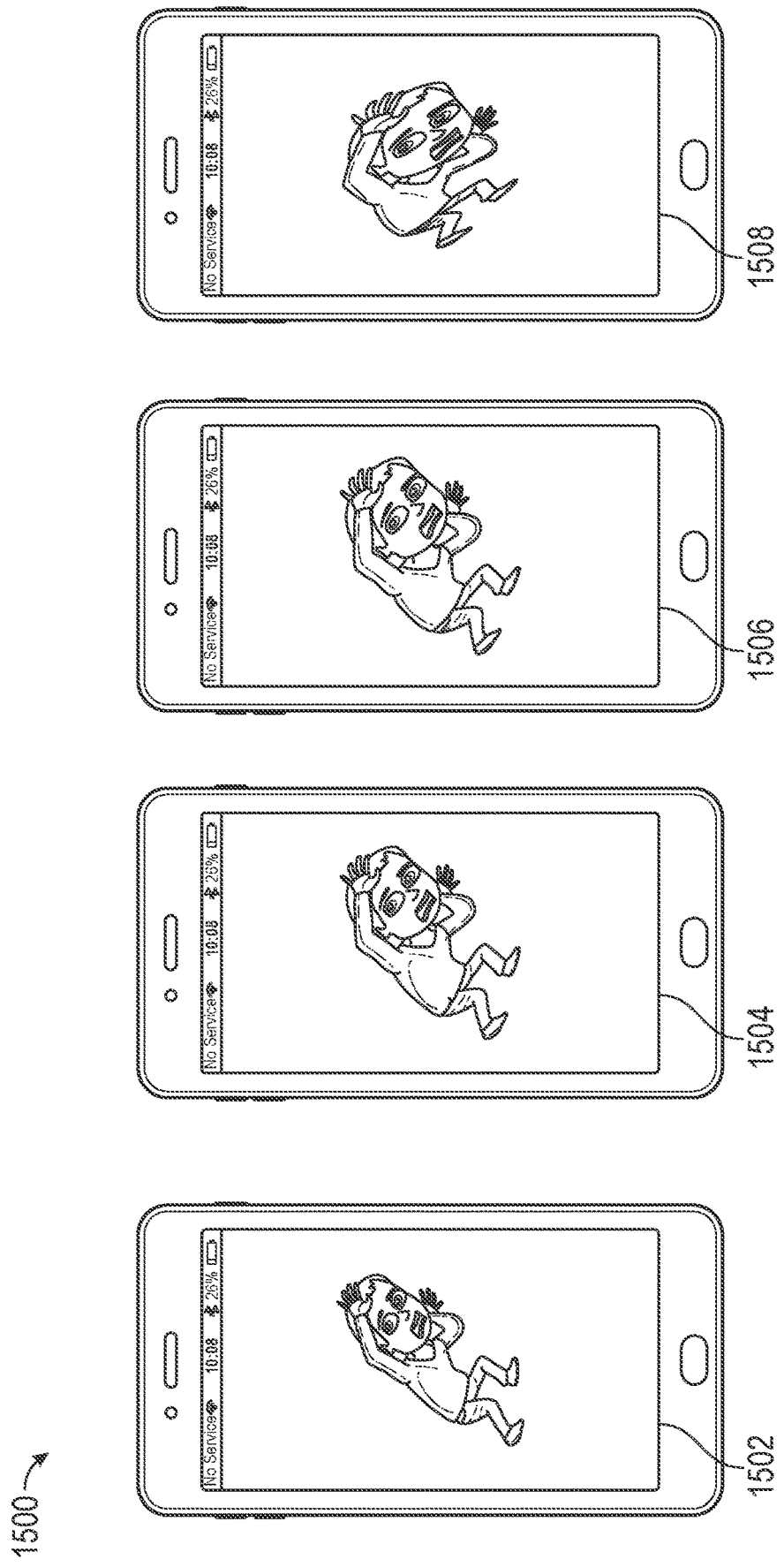
FIG. 15 provides screenshots in sequential order of an example customized personal avatar object rendering within a real world three-dimensional space by a redundant tracking system 124 using a surface aware lens, according to example embodiments.

FIG. 15 provides screenshots in sequential order of an example customized personal avatar object rendering within a real world three-dimensional space by a redundant tracking system 124 using a surface aware lens, according to various embodiments of the present disclosure. Sequence 1500 includes several different screenshots 1502, 1504, 1506, and 1508 of a customized personal avatar virtual object presented in a real world three-dimensional space as the user or camera is moving with respect to the personal avatar. Although the depicted personal avatar is shown as a static and flattened character, it is also contemplated that dynamic or animated personal avatars can also be used, and that a more rounded or three-dimensional personal avatar virtual object might also be provided depending upon the level of detail desired.

Figure 16:
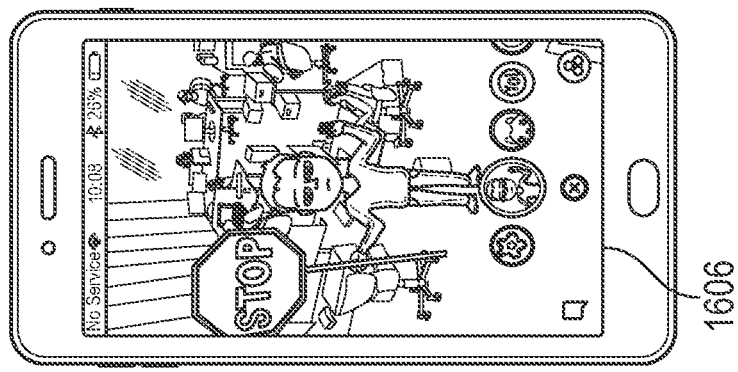
FIG. 16 provides screenshots of an example rendered customized personal avatar object at different real world three-dimensional locations by a redundant tracking system 124 using a surface aware lens, according to example embodiments.
Figure 16:
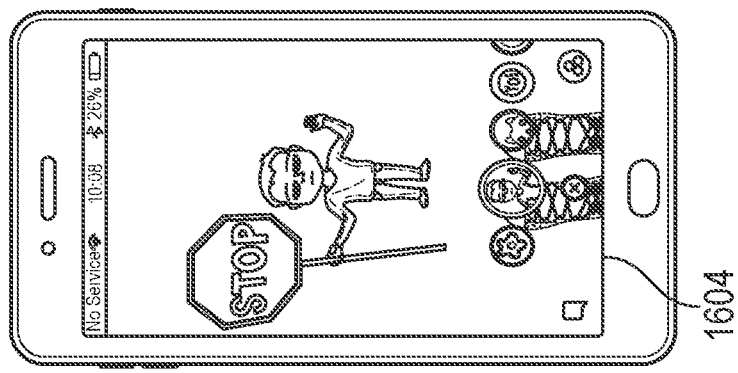
Figure 16:
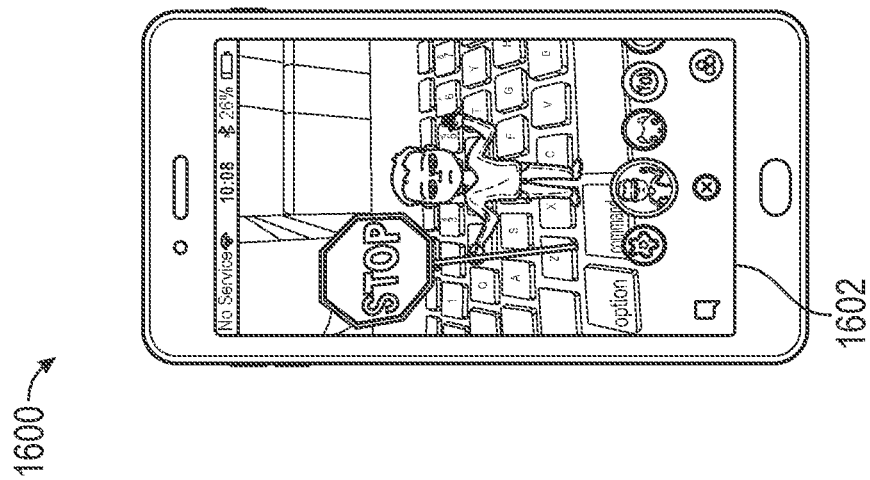

FIG. 16 provides screenshots of an example rendered customized personal avatar object at different real world three-dimensional locations by a redundant tracking system 124 using a surface aware lens, according to various embodiments of the present disclosure. Series 1600 includes several different screenshots 1602, 1604, 1606, of the same customized personal avatar virtual object statically presented in different real world three-dimensional locations. As shown in these screenshots, the same customized personal avatar is shown as holding up its hands with a stop sign as it has been rendered with respect to, for example, a keyboard, an inside floor, and an office space. Of course, other locations and reference surfaces or items are also possible, and only a select few have been illustrated for purpose of example.

Figure 17:
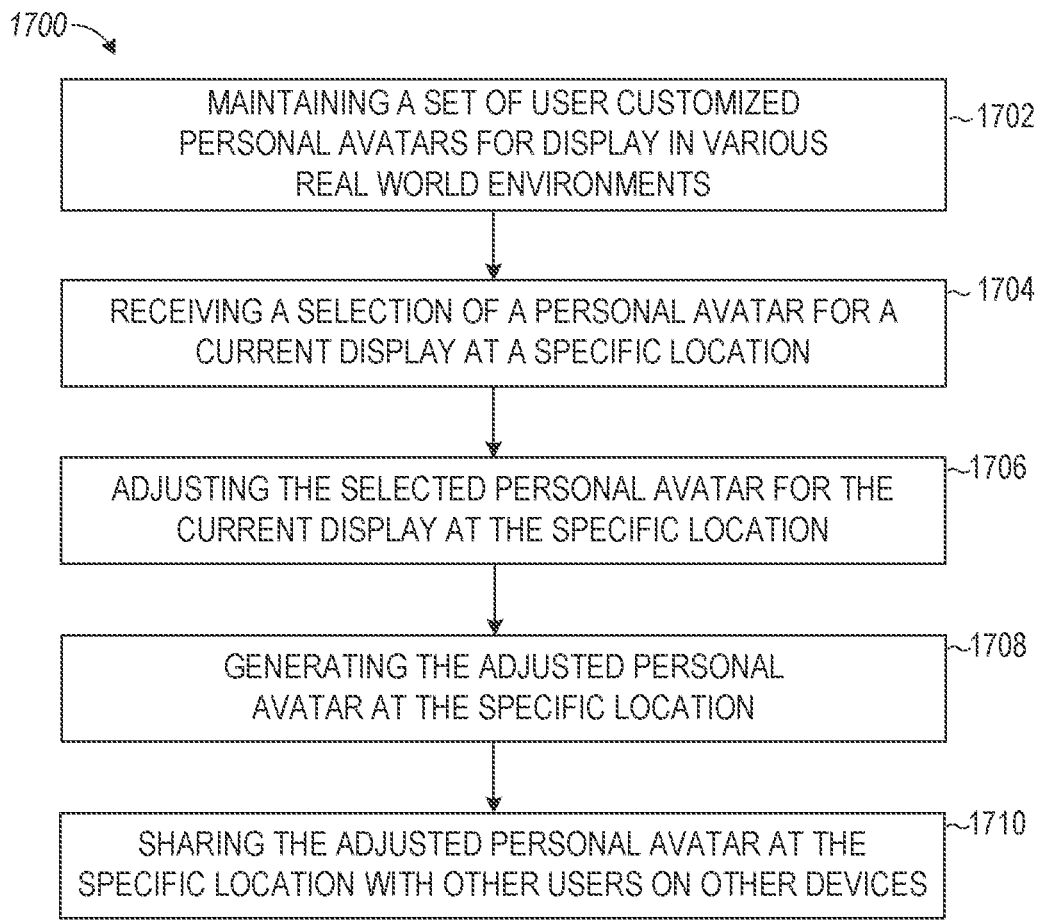
FIG. 17 is a flowchart illustrating a method for providing an example customized personal avatar object in a three-dimensional space using a surface aware lens, according to example embodiments.

FIG. 17 is a flowchart illustrating a method 1700 for providing users an example customized personal avatar object in a three-dimensional space using a surface aware lens, according to various embodiments of the present disclosure. Although similar to method 1400 set forth above, method 1700 sets forth a greater level of detail with respect to specific applications of personal avatars as the rendered virtual objects. As shown in FIG. 17, one or more operations 1702, 1704, 1706, 1708, and 1710 may similarly be performed as part of a persistent surface aware lens program or service for ongoing provisions of virtual object tracking and rendering aspects detailed herein. Although these operations may be performed at various locations by multiple entities (i.e., some server based and some client based), it will be understood that the various aspects can readily be ascertained and isolated to each specific location, system, and device as needed. For example, a method of providing customized personal avatar content performed only at a local device or on a local system or network might include all operations except for 1702, such as where a remote server or network maintains some personalized content. Such a remotely maintained system can be desirable where greater sharing of personalized content is preferred. Alternatively, a local device, system, or network might be used to maintain some or all of the personal avatar data for such a particular application As depicted in operation 1702, a specific personal avatar application or service can involve maintaining customized Bitmojis or other personal avatars. It is specifically contemplated that customized personal avatar virtual object content can be user created, and that this specific type of content can be stored and deleted according to various user preferences and selections. Customized personal avatars and related content can be readily extrapolated into various specific templates and situations based upon a user generated original personal avatar. Each of these avatars and content items can be adjusted and modified to suit particular preferences of a given user, and prior uses can be noted and organized by the system as part of the maintaining process that is provided in operation 1702.

At operation 1704, the personal avatar application or service can receive a selection of a particular personal avatar to be used for a current display at a specific location. This can involve, for example, a user selecting to use a previously used and stored personal avatar for their present location. This can typically involve a personal avatar for the user, but may also be a personal avatar for another user or person in some circumstances. In some cases, this may involve a location where that personal avatar has never been applied, such that a simple copy and paste of the previous usage may not be ideal or appropriate.

Accordingly, at operation 1706, the personal avatar application or service can adjust the selected personal avatar for the currently desired display at the specific location. This can involve several additional processes, such as scaling the selected personal avatar, as may be appropriate for a different location or reference surface. Such scaling may be performed by a personal avatar application at the local device, such as what may be done for other virtual objects during a scaling process. Such scaling may also be done or assisted by a remote application or service providing the selected customized content in some cases. In addition, further adjustments may be needed for a selected personal avatar in some cases. For example, broader selections of reference items in lieu of "references surfaces" may be permissible for a personal avatar, such that additional image context parameters outside of a simple reference surface may be considered. The keyboard shown in FIG. 16 is one example of such an alternative reference item. Also, a user may request a new modification in the previous personal avatar to reflect a new situation of the user.

At operation 1708, the personal avatar application or service can generate the adjusted personal avatar for the currently desired display at the specific location. This can involve virtual object generation processes that are the same or similar to those provided above for other virtual objects with respect to reference surfaces. This can also involve generation processes that account for a more liberal reference item policy, such that personal avatars can be generated and presented in a wider variety of detailed locations. As such, varied processing or factors may be considered in order to generate the adjusted personal avatar at a specific location that may be a new location for that avatar or even the entire system.

At operation 1710, the personal avatar application or service can share the adjusted personal avatar at the specific location with other users on other user devices. Accordingly, user customized personal avatar content can persist from and be shared between different user devices. For example, the "Stop" personal avatar on a keyboard as shown in screenshot 1602 of FIG. 16 might be visible to every user of the providing service that happens by that particular location. This might be used, for example, to let the owner of this personal avatar creatively alert other users not to use this computer or keyboard right now. As in the more general examples above, such customized content may be shared only with a select group of users rather than everyone. In addition to there being system based sharing of customized personal avatar content, there can also be peer-to-peer based sharing of such personal avatar content. For example, two users may elect to share customized personal avatars only between each other. Such content sharing may again be limited or expanded as desired by users, in terms of the amount of time, the types of content, and the users that are provided access.

Figure 18:
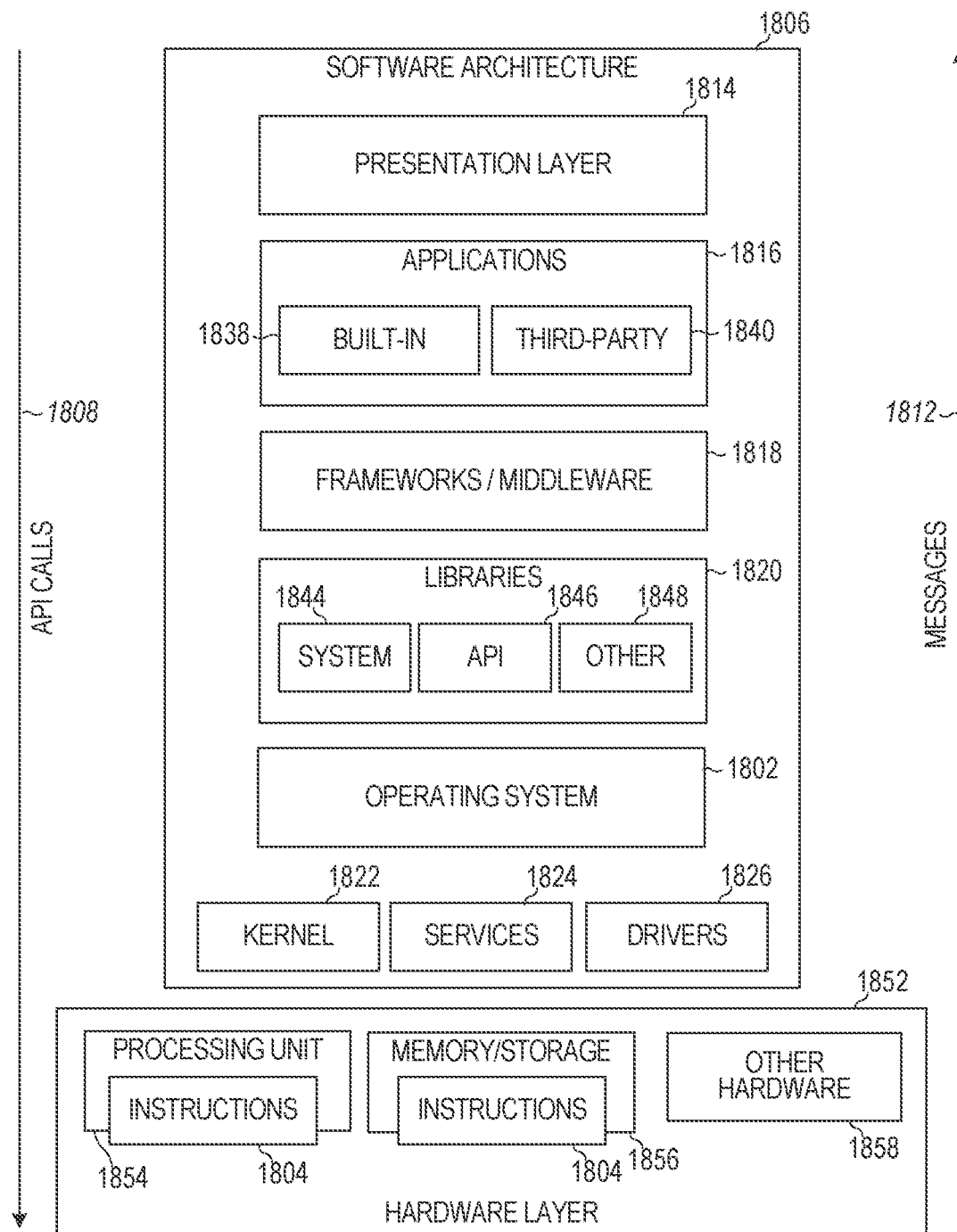
FIG. 18 is a block diagram illustrating a representative software architecture, which may be used in conjunction with various hardware architectures herein described, according to example embodiments.

FIG. 18 is a block diagram illustrating an example software architecture 1806, which may be used in conjunction with various hardware architectures herein described. FIG. 18 is a non-limiting example of a software architecture and it will be appreciated that many other architectures may be implemented to facilitate the functionality described herein. The software architecture 1806 may execute on hardware such as machine 1900 of FIG. 19 that includes, among other things, processors 1904, memory 1914, and input/output (I/O) components 1918. A representative hardware layer 1852 is illustrated and can represent, for example, the machine 1900 of FIG. 19. The representative hardware layer 1852 includes a processing unit 1854 having associated executable instructions 1804. Executable instructions 1804 represent the executable instructions of the software architecture 1806, including implementation of the methods, components and so forth described herein. The hardware layer 1852 also includes memory and/or storage modules memory/storage 1856, which also have executable instructions 1804. The hardware layer 1852 may also comprise other hardware 1858.

In the example architecture of FIG. 18, the software architecture 1806 may be conceptualized as a stack of layers where each layer provides particular functionality. For example, the software architecture 1806 may include layers such as an operating system 1802, libraries 1820, applications 1816, frameworks/middleware 1818, and a presentation layer 1814. Operationally, the applications 1816 and/or other components within the layers may invoke API calls 1808 through the software stack and receive a response 1812 as in response to the API calls 1808. The layers illustrated are representative in nature and not all software architectures have all layers. For example, some mobile or special purpose operating systems may not provide a frameworks/middleware 1818, while others may provide such a layer. Other software architectures may include additional or different layers.

The operating system 1802 may manage hardware resources and provide common services. The operating system 1802 may include, for example, a kernel 1822, services 1824, and drivers 1826. The kernel 1822 may act as an abstraction layer between the hardware and the other software layers. For example, the kernel 1822 may be responsible for memory management, processor management (e.g., scheduling), component management, networking, security settings, and so on. The services 1824 may provide other common services for the other software layers. The drivers 1826 are responsible for controlling or interfacing with the underlying hardware. For instance, the drivers 1826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1820 provide a common infrastructure that is used by the applications 1816 and/or other components and/or layers. The libraries 1820 provide functionality that allows other software components to perform tasks in an easier fashion than to interface directly with the underlying operating system 1802 functionality (e.g., kernel 1822, services 1824 and/or drivers 1826). The libraries 1820 may include system libraries 1844 (e.g., C standard library) that may provide functions such as memory allocation functions, string manipulation functions, mathematical functions, and the like. In addition, the libraries 1820 may include API libraries 1846 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1820 may also include a wide variety of other libraries 1848 to provide many other APIs to the applications 1816 and other software components/modules.

The frameworks/middleware 1818 (also sometimes referred to as middleware) provide a higher-level common infrastructure that may be used by the applications 1816 and/or other software components/modules. For example, the frameworks/middleware 1818 may provide various graphic user interface (GUI) functions, high-level resource management, high-level location services, and so forth. The frameworks/middleware 1818 may provide a broad spectrum of other APIs that may be utilized by the applications 1816 and/or other software components/modules, some of which may be specific to a particular operating system 1802 or platform.

The applications 1816 include built-in applications 1838 and/or third-party applications 1840. Examples of representative built-in applications 1838 may include, but are not limited to, a contacts application, a browser application, a book reader application, a location application, a media application, a messaging application, and/or a game application. Third-party applications 1840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1840 may invoke the API calls 1808 provided by the mobile operating system (such as operating system 1802) to facilitate functionality described herein.

The applications 1816 may use built in operating system functions (e.g., kernel 1822, services 1824, and/or drivers 1826), libraries 1820, and frameworks/middleware 1818 to create user interfaces to interact with users of the system. Alternatively, or additionally, in some systems interactions with a user may occur through a presentation layer, such as presentation layer 1814. In these systems, the application/component "logic" can be separated from the aspects of the application/component that interact with a user.

Figure 19:
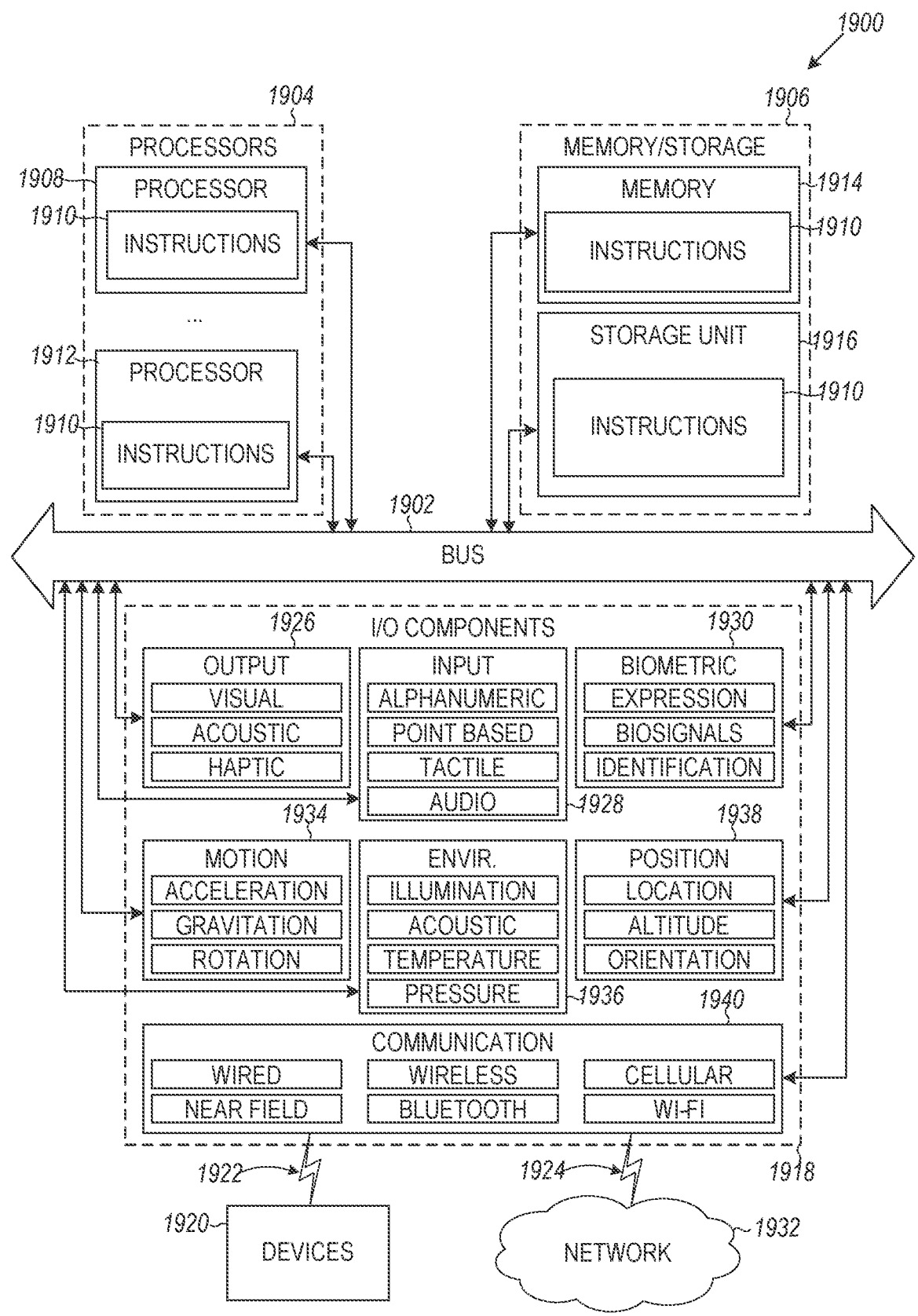
FIG. 19 is a block diagram illustrating components of a machine able to read instructions from a machine-readable medium (e.g., a machine-readable storage medium) and perform any one or more of the methodologies discussed herein, according to example embodiments.

FIG. 19 is a block diagram illustrating components of a machine 1900, according to some example embodiments, able to read instructions from a machine-readable medium (e.g., a machine-readable storage medium) and perform any one or more of the methodologies discussed herein. Specifically, FIG. 19 shows a diagrammatic representation of the machine 1900 in the example form of a computer system, within which instructions 1910 (e.g., software, a program, an application, an applet, an app, or other executable code) for causing the machine 1900 to perform any one or more of the methodologies discussed herein may be executed. As such, the instructions 1910 may be used to implement modules or components described herein. The instructions 1910 transform the general, non-programmed machine 1900 into a particular machine 1900 programmed to carry out the described and illustrated functions in the manner described. In alternative embodiments, the machine 1900 operates as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1910, sequentially or otherwise, that specify actions to be taken by machine 1900. Further, while only a single machine 1900 is illustrated, the term "machine" shall also be taken to include a collection of machines that individually or jointly execute the instructions 1910 to perform any one or more of the methodologies discussed herein.

The machine 1900 may include processors 1904, memory memory/storage 1906, and I/O components 1918, which may be configured to communicate with each other such as via a bus 1902. In an example embodiment, the processors 1904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1908 and a processor 1912 that may execute the instructions 1910. The term "processor" is intended to include multi-core processors 1904 that may comprise two or more independent processors (sometimes referred to as "cores") that may execute instructions contemporaneously. Although FIG. 19 shows multiple processors, the machine 1900 may include a single processor with a single core, a single processor with multiple cores (e.g., a multi-core processor), multiple processors with a single core, multiple processors with multiple cores, or any combination thereof.

The memory/storage 1906 may include a memory 1914, such as a main memory, or other memory storage, and a storage unit 1916, both accessible to the processors 1904 such as via the bus 1902. The storage unit 1916 and memory 1914 store the instructions 1910 embodying any one or more of the methodologies or functions described herein. The instructions 1910 may also reside, completely or partially, within the memory 1914, within the storage unit 1916, within at least one of the processors 1904 (e.g., within the processor's cache memory), or any suitable combination thereof, during execution thereof by the machine 1900. Accordingly, the memory 1914, the storage unit 1916, and the memory of processors 1904 are examples of machine-readable media.

The I/O components 1918 may include a wide variety of components to receive input, provide output, produce output, transmit information, exchange information, capture measurements, and so on. The specific I/O components 1918 that are included in a particular machine 1900 will depend on the type of machine. For example, portable machines such as mobile phones will likely include a touch input device or other such input mechanisms, while a headless server machine will likely not include such a touch input device. It will be appreciated that the I/O components 1918 may include many other components that are not shown in FIG. 19. The I/O components 1918 are grouped according to functionality merely for simplifying the following discussion and the grouping is in no way limiting. In various example embodiments, the I/O components 1918 may include output components 1926 and input components 1928. The output components 1926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1918 may include biometric components 1930, motion components 1934, environmental components 1936, or position components 1938 among a wide array of other components. For example, the biometric components 1930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1934 may include acceleration sensor components (e.g., accelerometer), gravitation sensor components, rotation sensor components (e.g., gyroscope), and so forth. The environment components 1936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1918 may include communication components 1940 operable to couple the machine 1900 to a network 1932 or devices 1920 via coupling 1924 and coupling 1922, respectively. For example, the communication components 1940 may include a network interface component or other suitable device to interface with the network 1932. In further examples, communication components 1940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1920 may be another machine or any of a wide variety of peripheral devices (e.g., a peripheral device coupled via a USB).

Moreover, the communication components 1940 may detect identifiers or include components operable to detect identifiers. For example, the communication components 1940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A system comprising:
   a memory;
   a redundant tracking subsystem comprising a set of tracking subsystems, the set of tracking subsystems comprising: a gyroscopic tracking system, a natural feature tracking system, and a simultaneous localization and mapping tracking system; and
   at least one hardware processor coupled to the redundant tracking subsystem to perform operations comprising:
   assigning a virtual object to a position in three-dimensional space captured within a camera view;
   rendering the virtual object to appear at the position in the three-dimensional space within the camera view; and
   maintaining, via the redundant tracking subsystem, the virtual object rendered at the position in the three-dimensional space while detecting one or more interruptions to one or more tracking indicia used by the redundant tracking subsystem.

2. The system of claim 1, wherein the rendering of the virtual object includes rendering a separate virtual representation related to the virtual object.

3. The system of claim 2, wherein the separate virtual representation is a simulated shadow of the virtual object.

4. The system of claim 1, further comprising receiving input indicative of a selection of a template from among a set of templates, the template corresponding to the virtual object.

5. The system of claim 1, wherein the virtual object comprises customized personal avatar content.

6. The system of claim 1, wherein the virtual object includes content selected based on external factors related to the three-dimensional space.

7. The system of claim 1, wherein the operations further comprise identifying the tracking indicia operable to track the virtual object in the three-dimensional space, wherein the maintaining of the virtual object rendered at the position in the three-dimensional space comprises tracking the virtual object using the tracking indicia.

8. The system of claim 7, wherein:
the tracking of the virtual object using the tracking indicia comprises tracking, by a first tracking subsystem from among the set of tracking subsystems, the virtual object at the position in the three-dimensional space using the tracking indicia;
the maintaining of the virtual object rendered at the position in the three-dimensional space further comprises:
detecting, by the first tracking subsystem, an interruption of the tracking indicia; and
in response to detecting the interruption of the tracking indicia, tracking the virtual object at the position in the three-dimensional space via a second tracking subsystem from among the set of tracking subsystems.

9. The system of claim 1, wherein the operations further comprise detecting a reference surface in a three-dimensional space captured within a camera view, wherein the assigning of the virtual object to the position in three-dimensional space is based on the reference surface.

10. The system of claim 9, wherein the detecting of the reference surface is based on user input.

11. The system of claim 9, wherein the position in the three-dimensional space is a predefined distance from a reference surface.

12. The system of claim 11, wherein maintaining the virtual object at the position in the three-dimensional space comprises maintaining the virtual object rendered at the predefined distance from the reference surface.

13. A method comprising:
assigning a virtual object to a position in three-dimensional space captured within a camera view;
rendering the virtual object to appear at the position in the three-dimensional space within the camera view; and
maintaining, via a redundant tracking subsystem, the virtual object rendered at the position in the three-dimensional space while detecting one or more interruptions to one or more tracking indicia used by the redundant tracking subsystem, the redundant tracking subsystem comprising a set of tracking subsystems, the set of tracking subsystems comprising: a gyroscopic tracking system, a natural feature tracking system, and simultaneous localization and mapping tracking system.

14. The method of claim 13, wherein the rendering of the virtual object includes rendering a separate virtual representation related to the virtual object.

15. The method of claim 13, wherein the virtual object includes content selected based on external factors related to the three-dimensional space.

16. The method of claim 13, further comprising identifying tracking indicia operable to track the virtual object in the three-dimensional space, wherein the maintaining of the virtual object rendered at the position in the three-dimensional space comprises tracking the virtual object using the tracking indicia.

17. The method of claim 16, wherein:
the tracking of the virtual object using the tracking indicia comprises tracking, by a first tracking subsystem from among the set of tracking subsystems, the virtual object at the position in the three-dimensional space using the tracking indicia;
the maintaining of the virtual object rendered at the position in the three-dimensional space further comprises:
detecting, by the first tracking subsystem, an interruption of the tracking indicia; and
in response to detecting the interruption of the tracking indicia, tracking the virtual object at the position in the three-dimensional space via a second tracking subsystem from among the set of tracking subsystems.

18. The method of claim 13, further comprising detecting a reference surface in a three-dimensional space captured within a camera view, wherein the assigning of the virtual object to the position in three-dimensional space is based on the reference surface.

19. The method of claim 18, wherein the position in the three-dimensional space is a predefined distance from a reference surface, wherein maintaining the virtual object at the position in the three-dimensional space comprises maintaining the virtual object rendered at the predefined distance from the reference surface.

20. A non-transitory machine-readable storage medium that includes instructions that, when executed by one or more processors of a machine, cause the machine to perform operations comprising:
assigning a virtual object to a position in three-dimensional space captured within a camera view;
rendering the virtual object to appear at the position in the three-dimensional space within the camera view; and
maintaining, via a redundant tracking subsystem, the virtual object rendered at the position in the three-dimensional space while detecting one or more interruptions to one or more tracking indicia used by the redundant tracking subsystem, the redundant tracking subsystem comprising a set of tracking subsystems, the set of tracking subsystems comprising: a gyroscopic tracking system, a natural feature tracking system, and simultaneous localization and mapping tracking system.

* * * * *